US006678591B2

(12) United States Patent
Ohmura et al.

(10) Patent No.: US 6,678,591 B2
(45) Date of Patent: Jan. 13, 2004

(54) SERVER FOR REMOTE VEHICLE TROUBLESHOOTING AND THE LIKE

(75) Inventors: Hiroshi Ohmura, Aki-Gun (JP); Koji Hosoda, Aki-Gun (JP); Shigefumi Hirabayashi, Aki-Gun (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 10/058,156

(22) Filed: Jan. 29, 2002

(65) Prior Publication Data

US 2002/0103582 A1 Aug. 1, 2002

(30) Foreign Application Priority Data

Jan. 31, 2001 (JP) ....................................... 2001-024543

(51) Int. Cl.[7] .................................................. G06F 7/00
(52) U.S. Cl. ............................................ 701/29; 701/30
(58) Field of Search ............................... 701/29, 30–36; 340/425.5

(56) References Cited

U.S. PATENT DOCUMENTS

| | | | | |
|---|---|---|---|---|
| 5,442,553 A | | 8/1995 | Parrillo | |
| 6,028,537 A | * | 2/2000 | Suman et al. | 340/988 |
| 6,181,994 B1 | | 1/2001 | Colson et al. | |
| 6,208,948 B1 | | 3/2001 | Klingler et al. | |
| 6,285,931 B1 | | 9/2001 | Hattori et al. | |

FOREIGN PATENT DOCUMENTS

| | | |
|---|---|---|
| DE | 196 50 047 A1 | 6/1998 |
| DE | 197 25 916 A1 | 1/1999 |
| EP | 0 982 697 B1 | 3/2000 |
| EP | 1 069 422 A1 | 1/2001 |
| EP | 0 685 723 B1 | 8/2001 |
| EP | 0 754 940 B1 | 8/2002 |
| JP | 10-010013 A | 1/1998 |
| JP | 11-051817 A | 2/1999 |
| JP | 11-223578 A | 8/1999 |

OTHER PUBLICATIONS

European Search Report, Application No. 02001194.6–2213, Dated: Jul. 23, 2002.

* cited by examiner

*Primary Examiner*—Yonel Beaulieu
(74) *Attorney, Agent, or Firm*—Nixon Peabody LLP; Donald R. Studebaker

(57) ABSTRACT

A server for remote vehicle troubleshooting from a remote location includes a troubleshooting program transmitter for transmitting to a vehicle a troubleshooting program for performing vehicle troubleshooting at the vehicle side upon receiving a request from an owner of the vehicle or at a predetermined time, a vehicle inspection result receiver for receiving from the vehicle inspection results regarding the vehicle obtained by executing the vehicle inspection program, and a trouble determining device for determining troubles particulars by analyzing the inspection results, and a trouble particular transmitter for transmitting the trouble particulars to the vehicle. The server enables vehicle troubleshooting and inspection to be performed simply without the need for the vehicle owner to visit a dealer and/or auto service shop.

44 Claims, 17 Drawing Sheets

FIG. 3

INFORMATION CONTRACT FORM

①NAVI ☐ YES ☐ NO
DELIVERY MAP INFORMATION FOR NAVI SERVICE
• INITIAL PURCHASE FEE OF $150 (NOT INCLUDING CELLULAR PHONE FEE)
• MONTHLY FEE OF $50 (CHANGES BASED ON OPTIONAL ITEMS)
<OPTIONAL ITEMS>
• ADVERTISEMENT INFORMATION DELIVERY ☐ YES ☐ NO
(ITEMS)
☐ RESTAURANT ADVERTISEMENTS ▼ $5
☐ CAR DEALER ADVERTISEMENTS ▼ $1/ONE DEALER
(······, MAZDA, ··········)
☐ DEPARTMENT STORE ADVERTISEMENTS ▼$3
☐ SPORTING GOODS SHOP ADVERTISEMENTS ▼ $1
☐ ELECTRIC APPLIANCE AND PC ADVERTISEMENTS ▼$2
☐ LEISURE FACILITY ADVERTISEMENTS ▼ $4
☐ HOTEL AND ACCOMMODATION ADVERTISEMENTS ▼ $3
(DELIVERY TIME)
☐ FULL TIME +0
☐ SATURDAY/SUNDAY/HOLIDAY +35%
☐ APPOINTED TIME PERIOD +10%
(ADVERTISEMENT DELIVERY METHOD)
☐ ICON & MESSAGE ▼−
☐ SUPERIMPOSED WHEN VEHICLE APPROACHES ADVERTISER LOCATION ▼5%
☐ CM AT NAVI STARTING TIME ▼5%
☐ VOICE ANNOUNCEMENT ▼10%
(DELIVERY TIME)
☐ MORE THAN 10 HOURS PER WEEK
MONTHLY CHARGE $25 (PENALTY $1 PER HOUR SHORT)

②MUSIC CONTRACT ☐ YES ☐ NO
DELIVERY OF FAVORITE MUSIC
MONTHLY FEE $5 (ADDITIONAL FEE FOR EVERY DELIVERY)
③KARAOKE CONTRACT ☐ YES ☐ NO
ONLINE KARAOKE SERVICE
MONTHLY FEE $5 (ADDITIONAL FEE FOR EVERY KARAOKE DELIVERY)
④VIDEO CONTRACT ☐ YES ☐ NO
DELIVERY OF FAVORITE VIDEO MOVIES
MONTHLY FEE $5 (ADDITIONAL FOR EVERY VIDEO MOVIE DELIVERY)
⑤VIDEO PHONE ☐ YES ☐ NO
VIDEO PHONE SERVICE
MONTHLY FEE $3
⑥PERSONAL SCHEDULE MANAGEMENT CONTRACT ☐ YES ☐ NO
DIGITAL SECRETARY SERVICE
MONTHLY FEE $1
⑦INTERNET & E-MAIL CONTRACT ☐ YES ☐ NO
ENABLE INTERNET ACCESS AND E-MAIL
MONTHLY FEE $5
⑧VEHICLE TROUBLESHOOTING CONTRACT ☐ YES ☐ NO
REMOTE VEHICLE TROUBLESHOOTING SERVICE
MONTHLY FEE $10
⑨PERIODIC INSPECTION/CONSUMABLE PARTS REPORT CONTRACT ☐ YES ☐ NO
REPORT ON TIME FOR PERIODIC INSPECTION AND REPLACEMENT OF EXPENDABLE PARTS
MONTHLY FEE $0 (INTERNET & E-MAIL CONTRACT REQUIRED)

SERVER FOR REMOTE VEHICLE TROUBLESHOOTING AND THE LIKE

BACKGROUND OF THE INVENTION

1. Field of the Invention

The present invention relates to a remote vehicle troubleshooting server and the like, particularly to a remote vehicle troubleshooting server and the like for conducting vehicle troubleshooting, periodic inspection, part order placement etc. from a location remote from the vehicle.

2. Description of the Related Art

Various vehicle troubleshooting technologies have been developed. Japanese Patent Unexamined Publication No. 10-10013, for example, discloses a troubleshooting system that uses a select monitor (diagnostic unit) installed at a car dealer's auto service shop, for instance, to troubleshoot vehicles. The system disclosed in this publication includes an electronic control unit installed in the vehicle for storing vehicle data, such as data acquired from onboard sensors, switches and actuators, and a select monitor (diagnostic unit) installed at the car dealer's auto service shop. The select monitor accesses the onboard electronic control unit to read various types of vehicle data, called internal data, uses its own metering functions to acquire vehicle data, and simultaneously displays the metered data and read-out internal data for easy comparison of corresponding data items. The troubleshooting system of this publication thus enhances troubleshooting efficiency by making it easy to judge the appropriateness of the data read from the onboard electronic control system.

Japanese Patent Unexamined Publication No. 11-51817 discloses a failure detection system that stores vehicle self-diagnosis information in an ignition key and makes a detailed analysis of failure location and failure condition based on diagnostic information read from the ignition key. More specifically, when the ignition key is removed from the cylinder lock, a vehicle transmitter outputs self-diagnosis information and a receiver of the ignition key receives the self-diagnosis information and stores it in an ignition key memory. The self-diagnosis information stored in the ignition key is read using a key information reader, the read-out diagnostic information is input to a personal computer, and the personal computer detects particulars regarding the failure location, failure condition and the like. The disclosed system is advantageous in that the ignition key is the only component that need by removed from the vehicle and carried by the vehicle owner and that upon receiving the key the dealer can read the self-diagnosis information, determine the site of the failure, the failure condition etc. and then immediately tell the owner the expected cost of labor and parts for repairing the vehicle and how long the repair will take.

Japanese Patent Unexamined Publication No. 11-223578 ('578) discloses a vehicle diagnostic system in which troubleshooting information regarding vehicle malfunction obtained by self-diagnosis is wirelessly transmitted from the vehicle to a base station and when the vehicle malfunction corresponding to the troubleshooting information is thereafter eliminated (repaired), malfunction-eliminated information (a repair-completed code) is wirelessly transmitted from the vehicle to the base station. With the system set out in this publication, when the base station has once received the vehicle troubleshooting information and thereafter received the associated repair-completed code, the base station can omit notices that would otherwise be sent to the vehicle regarding inspection, repair and maintenance, thereby eliminating meaningless procedural exchanges between the vehicle and base station.

However, all of these conventional systems require the vehicle itself to be equipped with a troubleshooting facility and the troubleshooting information produced by the troubleshooting facility to be forwarded to an external entity such as a dealer via some means such as a troubleshooting system (select monitor), ignition key or wireless transmitter.

Against this backdrop, the inventors discovered a new issue that has emerged owing to the wide-spread proliferation of the Internet, namely, that the need for remote troubleshooting via networks such as the Internet can be expected to expand in the future. Among the conventional technologies discussed in the foregoing, that taught by '578 wirelessly transmits vehicle troubleshooting information to a base station but the base station merely uses the troubleshooting information in connection with inspection/repair/maintenance notices regarding the vehicle concerned sent to the vehicle side (owner side). This can hardly be called remote troubleshooting.

Thus nothing specific has yet been proposed regarding remote vehicle troubleshooting.

SUMMARY OF THE INVENTION

Thus, the present invention was accomplished to offer a concrete solution to a new problem, that of how to respond to the need for vehicle remote vehicle troubleshooting, and has as one object to provide a server for remote vehicle troubleshooting, a remote vehicle troubleshooting method, a remote troubleshooting program, an onboard remote troubleshooting apparatus and the like that enable vehicle troubleshooting and inspection to be performed simply without need for the vehicle owner to visit a dealer and/or auto service shop.

Another object of the present invention is to provide a server for remote vehicle troubleshooting, a remote vehicle troubleshooting method, a remote troubleshooting program, an onboard remote troubleshooting apparatus and the like that enable reliable vehicle troubleshooting and inspection to be performed using an up-to-date model-specific troubleshooting database.

Another object of the present invention is to provide a server for remote vehicle troubleshooting, a remote vehicle troubleshooting method, a remote troubleshooting program, an onboard remote troubleshooting apparatus and the like that enable the vehicle owner to stay mindful of times for periodic inspection and replacement of expendable parts.

Another object of the present invention is to provide a server for remote vehicle troubleshooting, a remote vehicle troubleshooting method, a remote troubleshooting program, an onboard remote troubleshooting apparatus and the like that easily pinpoint vehicle malfunctions.

The present invention achieves the above objects by, in a first aspect, providing a server for remote vehicle troubleshooting, in second aspect, providing a remote vehicle troubleshooting method that is implemented by the server for remote vehicle troubleshooting, in third aspect, providing a remote vehicle troubleshooting program that is executed by the server for remote vehicle troubleshooting, in a fourth aspect, providing an onboard remote troubleshooting apparatus, in a fifth aspect, providing an remote vehicle troubleshooting method that is implemented by the vehicle, and, in a sixth aspect, providing a remote vehicle troubleshooting program that is executed by the onboard apparatus of the vehicle.

The server for remote vehicle troubleshooting according to the first aspect of the invention, which performs vehicle troubleshooting from a remote location, comprises, in one configuration thereof, a troubleshooting program transmitter for transmitting to a vehicle a troubleshooting program for performing vehicle troubleshooting at the vehicle side upon receiving a request from an owner of the vehicle or at a predetermined time, a vehicle inspection result receiver for receiving from the vehicle inspection results regarding the vehicle obtained by executing the troubleshooting program, a trouble determining device for determining trouble particulars by analyzing the inspection results, and a trouble particular transmitter for transmitting the trouble particulars to the vehicle.

The server for remote vehicle troubleshooting according to the first aspect of the invention, which performs vehicle troubleshooting from a remote location, comprises, in another configuration thereof, a trouble site pinpointing program transmitter for transmitting to a vehicle a trouble site pinpointing program for performing vehicle troubleshooting at the vehicle side when an owner of the vehicle feels that something may be wrong, the trouble site pinpointing program being made so that the owner selects a plurality of troubleshooting items that are hierarchically formatted, a vehicle inspection result receiver for receiving from the vehicle inspection results regarding the vehicle obtained by executing the trouble site pinpointing program, a trouble particular determining device for determining trouble particulars by analyzing the inspection results, and a trouble particular transmitter for transmitting the trouble particulars to the vehicle.

The remote vehicle troubleshooting method according to the second aspect of the invention, which performs vehicle troubleshooting from a remote location, comprises, in one configuration thereof, the steps of transmitting to a vehicle a troubleshooting program for performing vehicle troubleshooting at the vehicle side upon receiving a request from an owner of the vehicle or at a predetermined time, receiving from the vehicle inspection results regarding the vehicle obtained by executing the troubleshooting program, determining trouble particulars by analyzing the inspection results, and transmitting the trouble particulars to the vehicle.

The remote vehicle troubleshooting method according to the second aspect of the invention, which performs vehicle troubleshooting from a remote location, comprises, in another configuration thereof, the steps of transmitting to a vehicle a trouble site pinpointing program for performing vehicle troubleshooting at the vehicle side when an owner of the vehicle feels that something may be wrong, the trouble site pinpointing program being made so that the owner selects a plurality of troubleshooting items that are hierarchically formatted, receiving from the vehicle inspection results regarding the vehicle obtained by executing the trouble site pinpointing program, determining trouble particulars by analyzing the inspection results, and transmitting the trouble particulars to the vehicle.

The remote vehicle troubleshooting program according to the third aspect of the invention, which controls a computer of a server so as to perform vehicle troubleshooting from a remote location, comprises, in one configuration thereof, instructions for transmitting to a vehicle a troubleshooting program for performing vehicle troubleshooting at the vehicle side upon receiving a request from an owner of the vehicle or at a predetermined time, instructions for receiving from the vehicle inspection results regarding the vehicle obtained by executing the troubleshooting program, instructions for determining trouble particulars by analyzing the inspection results, and instructions for transmitting the trouble particulars to the vehicle.

The remote vehicle troubleshooting program according to the third aspect of the invention, which controls a computer of a server so as to perform vehicle troubleshooting from a remote location, comprises, in another configuration thereof, instructions for transmitting to a vehicle a trouble site pinpointing program for performing vehicle troubleshooting at the vehicle side when an owner of the vehicle feels that something may be wrong, the trouble site pinpointing program being made so that the owner selects a plurality of troubleshooting items that are hierarchically formatted, instructions for receiving from the vehicle inspection results regarding the vehicle obtained by executing the trouble site pinpointing program, instructions for determining trouble particulars by analyzing the inspection results, and instructions for transmitting the trouble particulars to the vehicle.

The onboard remote troubleshooting apparatus according to the fourth aspect of the invention, which performs vehicle troubleshooting from a remote location, comprises, in one aspect thereof, a troubleshooting program receiver for receiving from an external server a troubleshooting program for performing vehicle troubleshooting at the vehicle side upon receiving a request from an owner of the vehicle or at a predetermined time, an inspection device for executing the troubleshooting program to obtain inspection results regarding the vehicle, an inspection result transmitter for transmitting the inspection results to the external server so that the external server can determine trouble particulars by analyzing the inspection results, and a trouble particular receiver for receiving the trouble particulars from the external server.

The onboard remote troubleshooting apparatus according to the fourth aspect of the invention, which performs vehicle troubleshooting from a remote location, comprises, in another aspect thereof, a trouble site pinpointing program receiver for receiving from an external server a trouble site pinpointing program for performing vehicle troubleshooting at the vehicle side when an owner of the vehicle feels that something may be wrong, the trouble site pinpointing program being made so that the owner selects a plurality of troubleshooting items that are hierarchically formatted, an inspection device for executing the trouble site pinpointing program to obtain inspection results regarding the vehicle, an inspection result transmitter for transmitting the inspection results to the external server so that the external server can determine trouble particulars by analyzing the inspection results, and a trouble particular receiver for receiving the trouble particulars from the external server.

The remote vehicle troubleshooting method according to the fifth aspect of the invention performs vehicle troubleshooting from a remote location, comprises, in one configuration thereof, the steps of receiving from an external server a troubleshooting program for performing vehicle troubleshooting at the vehicle side upon receiving a request from an owner of the vehicle or at a predetermined time, executing the troubleshooting program to obtain inspection results regarding the vehicle, transmitting the inspection results to the external server so that the external server can determine trouble particulars by analyzing the inspection results, and receiving the trouble particulars from the external server.

The remote vehicle troubleshooting method according to the fifth aspect of the invention performs vehicle troubleshooting from a remote location, comprises, in another configuration thereof, the steps of receiving from an external server a trouble site pinpointing program for performing vehicle troubleshooting at the vehicle side when an owner of the vehicle feels that something may be wrong, the trouble site pinpointing program being made so that the owner selects a plurality of troubleshooting items that are hierarchically formatted, executing the trouble site pinpointing program to obtain inspection results regarding the vehicle, transmitting the inspection results to the external server so that the external server can determine trouble particulars by analyzing the inspection results, and receiving the trouble particulars from the external server.

The remote vehicle troubleshooting program according to the sixth aspect of the invention, which controls an onboard computer of a vehicle so as to perform vehicle troubleshooting from a remote location, comprises, in one configuration thereof, instructions for receiving from an external server a troubleshooting program for performing vehicle troubleshooting at the vehicle side upon receiving a request from an owner of the vehicle or at a predetermined time, instructions for executing the troubleshooting program to obtain inspection results regarding the vehicle, instructions for transmitting the inspection results to the external server so that the external server can determine trouble particulars by analyzing the inspection results, and instructions for receiving the trouble particulars from the external server.

The remote vehicle troubleshooting program according to the sixth aspect of the invention, which controls an onboard computer of a vehicle so as to perform vehicle troubleshooting from a remote location, comprises, in another configuration thereof, instructions for receiving from an external server a trouble site pinpointing program for performing vehicle troubleshooting at the vehicle side when an owner of the vehicle feels that something may be wrong, the trouble site pinpointing program being made so that the owner selects a plurality of troubleshooting items that are hierarchically formatted, instructions for executing the trouble site pinpointing program to obtain inspection results regarding the vehicle, instructions for transmitting the inspection results to the external server so that the external server can determine trouble particulars by analyzing the inspection results, and instructions for receiving the trouble particulars from the external server.

The above and other objects and features of the present invention will be apparent from the following description made with reference to the accompanying drawings showing preferred embodiments of the present invention.

BRIEF DESCRIPTION OF THE DRAWINGS

In the accompanying drawings:

FIG. 3 is an example of an information center agreement used in an embodiment of the present invention;

DETAILED DESCRIPTION OF THE PREFERRED EMBODIMENTS

Preferred embodiments of the present invention will now be explained with reference to the drawings.

Figure 1:
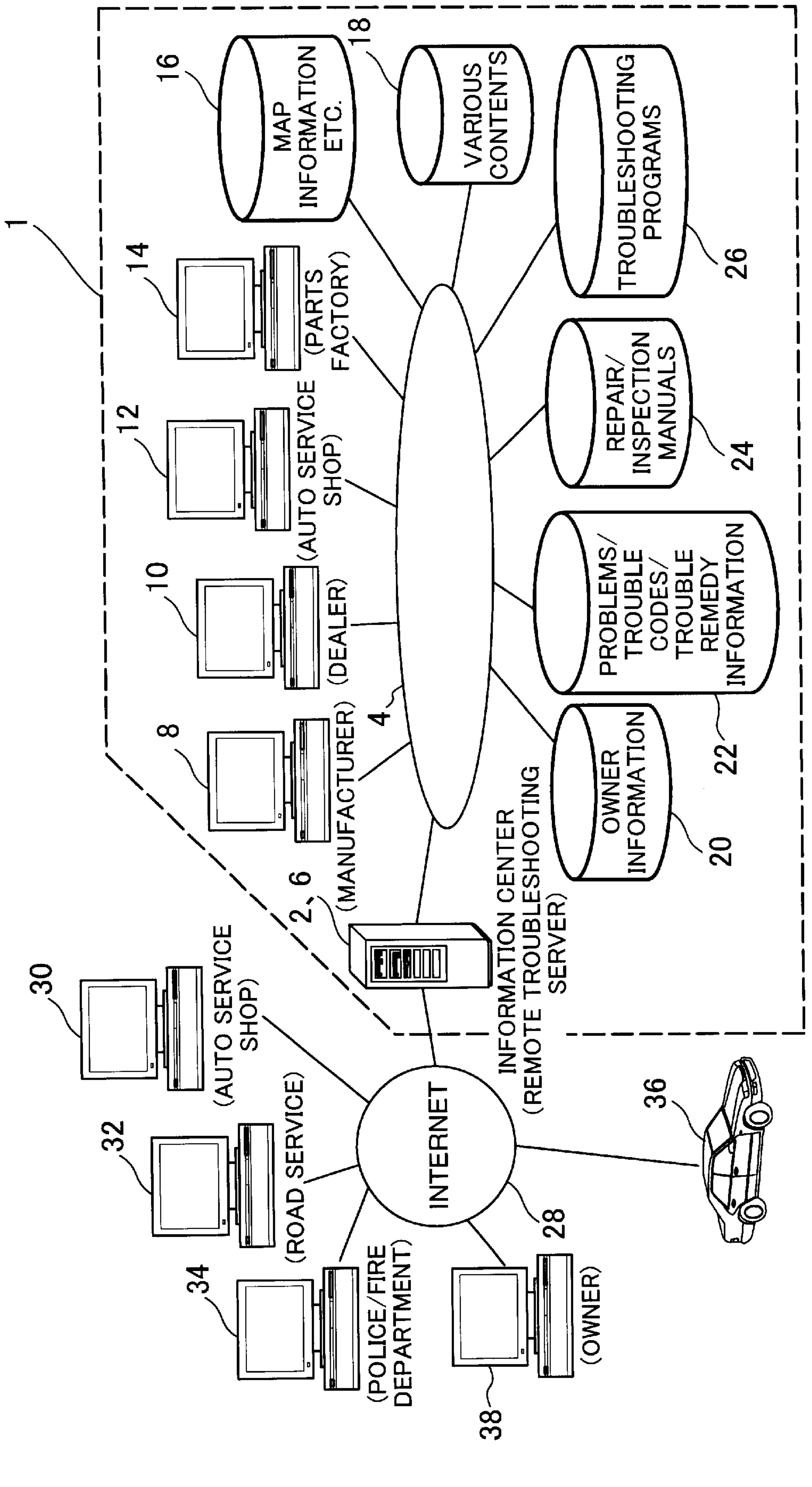
FIG. 1 is a basic configuration diagram showing a remote vehicle troubleshooting system according to an embodiment of the present invention.

FIG. 1 is a basic configuration diagram showing a remote vehicle troubleshooting system according to an embodiment of the present invention As shown in FIG. 1, a remote vehicle troubleshooting system 1 comprises an information center 2 that is connected through a network 4 to different computers and different databases with which it can exchange data. The information center 2 is equipped with a remote troubleshooting server 6.

The information center 2 (remote troubleshooting server 6) is connected through the network 4 to the computers of, for instance, a manufacturer 8, dealer 10, auto service shop 12 and parts factory 14.

The different databases to which the information center 2 (remote troubleshooting server 6) is connected through the network 4 include, for example, a database 16 storing map information and the like, a database 18 storing various contents, a database 20 storing owner information, a database 22 storing vehicle problem, trouble code and trouble remedy information, a database 24 storing repair/inspection manuals, and a database 26 storing troubleshooting programs. The data stored in these databases are supplied to and utilized by the information center 2 (remote troubleshooting server 6).

The information center 2 is connected through Internet 28 to various external facilities, specified vehicles, and vehicle owner computers. The connected facilities include an auto service shop 30, road service 32 and police/fire department 34. Also connected are vehicles 36 (only one shown) of owners who have concluded an agreement explained later and their computers (home PCs, mobile computers etc.) 38 (only one shown). Each vehicle 36 is equipped with an onboard computer 40 explained later. The onboard computer 40 and the information center 2 send/receive various kinds of information to/from each other via the Internet 28.

Although this embodiment uses the Internet, the present invention is not limited to use of the Internet but may instead utilize any of various other kinds of networks and communication means.

In this specification, the term "owner" is used in some contexts to include not only the person who owns the vehicle but also any person who drives the vehicle or uses the services etc. provided in accordance with the invention.

The contents of the different databases will now be explained. The database 16 storing map information and the like contains map information, non-map information (advertisement information etc.) and homepage information regarding various objects. The map information includes map data and, superimposed on the map data, road information including traffic regulatory information such as intersections, one-way traffic signs, and no-right-turn and no-left-turn signs. The database 16 also contains non-map information such as advertising information (contents) that will be explained later. The database 18 storing various contents contains information regarding music, karaokes, videos, television telephones, personal schedules, and Internet and e-mails, all of which will be explained below.

The database 20 storing owner information contains personal data regarding the owner (customer) and data specific to individual customer-owned vehicles. These include, for example, individual customer data such as owner's license issue data (renewal period), insurance company and the like, and vehicle data such as repair/inspection history data, mileage data and the like. When the owner has concluded the agreement explained later (see FIG. 3), these data are also effectively utilized for remote troubleshooting. The owner information is periodically updated to the most recent information.

The database 22 storing vehicle problem etc. information contains model-specific data peculiar to individual vehicle models, including model-specific data regarding customer complaints, vehicle problems and the like. The model-specific information is also periodically updated to the most recent information. By utilizing the information stored in the database 22, therefore, it is possible to ascertain with high statistical accuracy what components etc. of specific models are most prone to failure.

The database 24 storing repair/inspection manuals contains service manuals that provide information on how to check the engine oil and put on tire chains, as will be explained later.

The database 26 contains a first troubleshooting program, a second troubleshooting program, a trouble site pinpointing program and the like, all of which will be explained below. These troubleshooting programs are periodically updated based on the model-specific data stored in the database 22. The particulars of these troubleshooting programs will be explained in detail later.

Figure 2:
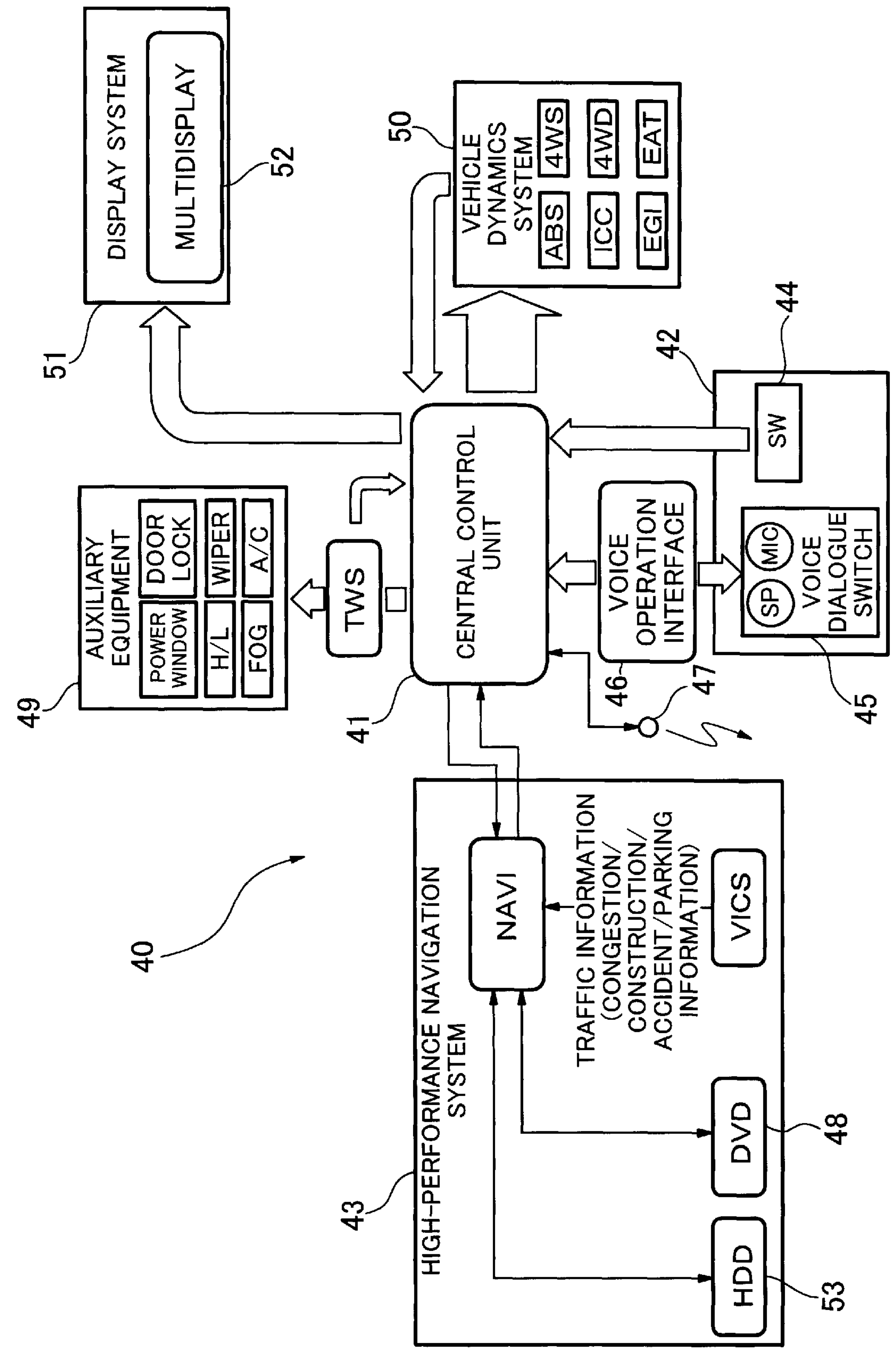
FIG. 2 is an overall configuration diagram showing an onboard computer used in an embodiment the present invention.

The onboard computer 40 installed in the individual vehicle will now be explained with reference to FIG. 2. The onboard computer 40 is equipped with a central control unit 41. The central control unit 41 is connected to an operating system 42 that produces output signals. The operating system 42 is equipped with various switches 44 and a voice dialogue switch 45 such as a microphone and a speaker. The switches 44 output switch signals and the like based on operations performed by the vehicle operator to the central control unit 41. The voice dialogue switch 45 exchanges signals with the central control unit 41 through an interface 46 to enable communication with the outside via a telephone terminal, wireless terminal and other such communication terminals 47.

Constituent elements that receive signals output by the central control unit 41 include auxiliary equipment 49 and a vehicle dynamics system 50. Installed auxiliary equipment 49 includes, for example, a power window system, door lock system, fuel gauge, windshield wipers, fog lamps, air conditioner etc. Signals output by the central control unit 41 are input to the onboard computer 40 through a multiplex transmission system. The auxiliary equipment 49 sends state signals, a gasoline level signal and the like to the central control unit 41.

The vehicle dynamics system 50 is equipped with systems for enabling total vehicle dynamics control, such as an anti-lock brake system (ABS), four-wheel steering (4WS) system, intelligent cruise control (ICC) system, four-wheel drive (4WD) system, electronic gas injection (EGI) system and electronic automatic transmission (EAT) system. The central control unit 41 outputs signals (road geometry, road surface friction coefficient $\mu$, distance to vehicle ahead, weight distribution, owner driving intention etc.) to these constituent elements as circumstances require. The vehicle dynamics system 50 sends dynamic state monitoring, system warning and air pressure from the ABS to the central control unit 41.

A high-performance navigation system 43 is provided as another constituent element that exchanges signals with the central control unit 41. The high-performance navigation system 43 is equipped with a navigation control means NAVI, a traffic information communications system VICS, a DVD-ROM 48 (replaceable with a CD-ROM or other storage medium) pre-recorded with map information etc., and a memory device 53 such as a hard disk drive or the like for temporarily storing troubleshooting programs (explained later) and various other data written thereto through the communication terminals 47 by external means including the information center 2. Traffic information from the VICS, map information etc. from the DVD-ROM 48, troubleshooting programs from the memory device 53 and the like are input to the central control unit 41 through the NAVI. The high-performance navigation system 43 also receives signals output by the central control unit 41, which are used to write driving state information and the like regarding the vehicle dynamics system 50 to the memory device 53.

A display system 51 is provided as another constituent element that receives signals output by the central control unit 41. The display system 51 is provided with a multidisplay 52 (hereinafter called "display 52") and the like. The display 52 is installed at an easy-to-view location near the vehicle owner's seat.

The display 52 can be detached from the vehicle. When detached, it can wirelessly exchange required information with the central control unit 41. Further, the display 52 is equipped with a speaker that enables it to offer voice guidance during implementation of a troubleshooting guide explained later. The display 52 receives signals output by the central control unit 41 that it uses to display information regarding malfunctioning and the current state (raw data) of the auxiliary equipment 49, the vehicle dynamics system 50 etc. and also to display driving state information, navigation images and the like. The display 52 also displays various information concerning troubleshooting when troubleshooting is performed as explained later.

Although not illustrated, the high-performance navigation system 43 is equipped with a GPS receiver, a vehicle speed sensor and a gyro sensor for detecting the current position of the vehicle. The GPS receiver detects the current position using radio signals received from earth satellites, the vehicle speed sensor detects the vehicle speed in order to determine distance traveled, and the gyro sensor detects the vehicle travel direction. The current position of the vehicle can be accurately determined from the detection values obtained from these sensors.

Various kinds of information are supplied from the information center 2 to the onboard computer 40 under a fee-based service agreement concluded beforehand between the vehicle owner and the information center. The agreement with the information center is normally concluded in writing at a car dealer when the owner purchases the motor vehicle. However, the owner may conclude an agreement with the information center 2 through the Internet 28 using the onboard computer 40 when purchasing the vehicle. Further, the owner may conclude an agreement with the information center 2 through the Internet 28 using the home computer 38 or the like.

FIG. 3 is an example of an information center agreement form. Contents of the agreement will be explained with reference to FIG. 3. The information center agreement basically includes two sections: (1) a navigation or NAVI agreement and (2)–(9) other agreements.

First, the NAVI agreement will be explained. The NAVI agreement covers the delivery of map information to the high-performance navigation system 43 (basic agreement) and the delivery of advertisement information to the system 4 (optional agreement).

The NAVI agreement includes an initial purchase fee of $150 for the navigation system and a monthly fee of $50 that is changed based on optionally selected items.

Next, when optional agreements are made, the following various items may be selected and the monthly fee of $50 will be changed. Namely, when an agreement is concluded for delivery of "Advertisement Information" and then one or more of "Restaurant Advertisements," "Car Dealer Advertisements," "Department Store Advertisements," "Sporting Goods Shop Advertisements," "Electric Appliance and PC Advertisements," "Leisure Facility Advertisements" and "of Hotel and Accommodation Advertisements" are selected, the monthly fee of $50 is reduced. For example, when the "Restaurant Advertisements" is selected $5 is deducted from the monthly fee of $50. Similarly, when other items are selected, amounts of money corresponding to the items in FIG. 3 are deducted from the monthly fee of $50.

Next, when one or more optional contacts are made and "Full Time Delivery," which provides information delivery from the information center 2 on a full-time basis, is further selected, the monthly fee remains unchanged from that after the deductions made based on the optionally selected items. However, when "Saturday, Sunday and Holiday Delivery," which provides information delivery from the information center 2 only on Saturdays, Sundays and holidays, is further selected, the monthly fee is increased 35%. Further, when "Appointed Time Period 10 a.m.–5p.m.," which provides information delivery only from the appointed time period of 10 a.m. to 5p.m., the monthly fee is increased 10%.

Further, when "Icon & Message," which uses icons and messages for display regarding the distribution of "Advertisement Information," is further selected, the monthly fee remains unchanged from that after the amounts deducted based on the optionally selected items. When "Superimposed When Vehicle Approaches Advertiser Location," which displays superimposed information when the vehicle approaches an object related to a selected item, is further selected, the monthly fee is reduced 5%. When "CMNAVI at Starting Time," which displays objects related to the selected items when the navigation system is started, is further selected, the monthly fee is further reduced 5%. When "Voice," which provides information about objects related to the selected items by a voice announcement, is further selected, the monthly fee is still further reduced 10%.

When an agreement is concluded for delivery of "Advertisement Information" and for "More Than 10 Hours Delivery per Week" is further selected, the monthly fee of $50 is reduced 50% to $25. As a result, the owner is likely to positively view the advertisement information. However, if the owner does not use the navigation system for 10 or more hours a week, a penalty of $1 per hour under ten hours is added to the reduced monthly fee of $25.

Accordingly, by concluding NAVI agreements the information center 2 can considerably defray the initial cost of the high-performance navigation system 43 (the above-mentioned $150) and further secure operating funds in the form of the monthly agreement fees, which increase in proportion to the number of agreements with customers.

Further, since the customers (owners) can select the distributed advertisement types based on their preferences, advertisements of no interest to the owners are not displayed on the navigation system. Since only necessary advertisement information is distributed, the owners can effectively utilize the advertisement information and can further reduce the monthly fee of the NAVI agreement. Regarding this, although the monthly fees are reduced when customers make optional agreements, the information center 2 can collect advertising fees from the companies that place the advertisements and, therefore, can secure a much greater amount of operating funds in total from the customers (owners) and advertisers in combination. Thus, the information center 2 can also secure sufficient operating funds from this aspect.

When the delivery time is limited, the monthly fee increases but the customers (owners) can use the high-performance navigation system 43 according to their lifestyles. The advertisers are charged higher advertising fees when the customers select full time delivery. When limited day or time delivery is selected, the advertisers are charged lower advertising fees while the customers (owners) are charged higher monthly fees. Overall, therefore, the information center 2 can secure a satisfactory amount of income.

Further, when an agreement is concluded for "More Than 10 Hours Delivery per Week" based on the distribution of "Advertisement Information," the monthly fee is considerably reduced. The owners are therefore likely to positively view the advertisement information displayed on the navigation system. On the other hand, when the navigation system is not used for at least the predetermined number of hours a week (10 hours), the owners have to pay penalties. The monthly fees from the owners therefore increase. Further, the information center can charge advertisers relatively high advertising fees on the basis of owner use of at least the predetermined number hours a week.

Next, the information center agreement other than the NAVI agreement will be explained with reference to FIG. 3. The information center agreement further includes a "Music Agreement," a "Karaoke Agreement," a "VIDEO Agreement," a "Videophone Agreement," a "Personal Schedule Management Agreement," an "Internet & E-Mail Agreement," a "Vehicle Online Troubleshooting Agreement," and a "Periodic Inspection/Expendable Parts Report Agreement". The customers (owners) may select some of such agreements based on their preferences and needs. When making these agreements other than the NAVI agreement, additional monthly fees need to be paid in addition to the monthly fee of $50 for the NAVI agreement (which may change depending on selected options).

The monthly fee for "Vehicle Online Troubleshooting" is a low $1 (or the service can be offered free) and the "Periodic Inspection/Expendable Parts Report " is free. A large number of owners can therefore be expected to sign up for these two services.

Contents related to these agreements are stored in the database 18 for storing various contents. Contents related to "Vehicle Online Troubleshooting" and "Periodic Inspection/Expendable Parts Report" (data and programs) are also stored in the databases 20, 22, 24 and 26.

The respective customers (owners) may enjoy the various contents based on their preferences and needs by paying the additional monthly fees. The information center 2 can secure further operating funds by obtaining the additional monthly fees.

The particulars of the services the information center 2 provides to customers (owners) who sign up for "Vehicle Online Troubleshooting" and/or "Periodic Inspection/Expendable Parts Report" among the different agreements offered will now be explained in detail. These two services will be collectively referred to as "Remote Troubleshooting Services."

Figure 4:
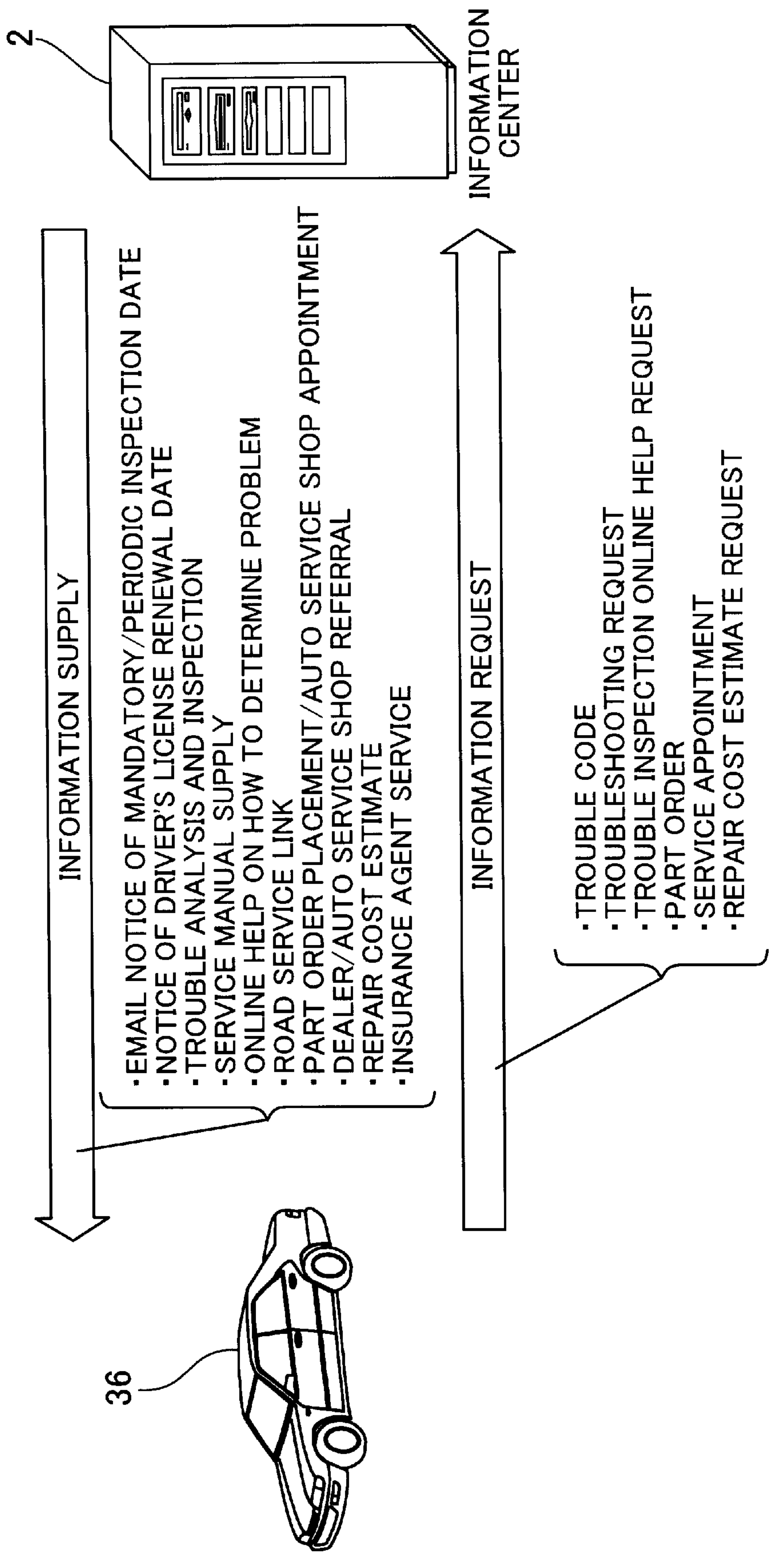
FIG. 4 is a conceptual diagram outlining particulars of remote troubleshooting according to an embodiment of the present invention.

A general explanation of "Remote Troubleshooting Services" will first be given with reference to FIG. 4. In preparation for conducting "Remote Troubleshooting Services," the information center 2 first transmits various information, including information for performing remote troubleshooting, to the onboard computer 40 of the owner's vehicle 36 via the Internet 28. On the other hand, the onboard computer 40 of the vehicle 36 transmits various information, including information for performing remote troubleshooting, to the information center 2. The information center 2 may instead transmit certain types of required information to the computer 38 at the owner's (customer's) home or office rather than to the onboard computer 40, and may also receive certain types of data from the computer 38.

The information transmitted from the information center 2 to the vehicle 36 include email notice of mandatory/periodic inspection dates, notice of driver's license renewal dates, trouble analysis and inspection (using troubleshooting program explained later), service manual supply, online help on how to determine problems (using "trouble site pinpointing program" discussed later), road service link, part order placement/auto service shop appointment, auto service shop referral, repair cost estimate, and the like.

Information transmitted from the vehicle 36 to the information center 2 includes trouble code, troubleshooting request, trouble inspection online help request, part order, service appointment, repair cost estimate request, and the like.

Figure 5:
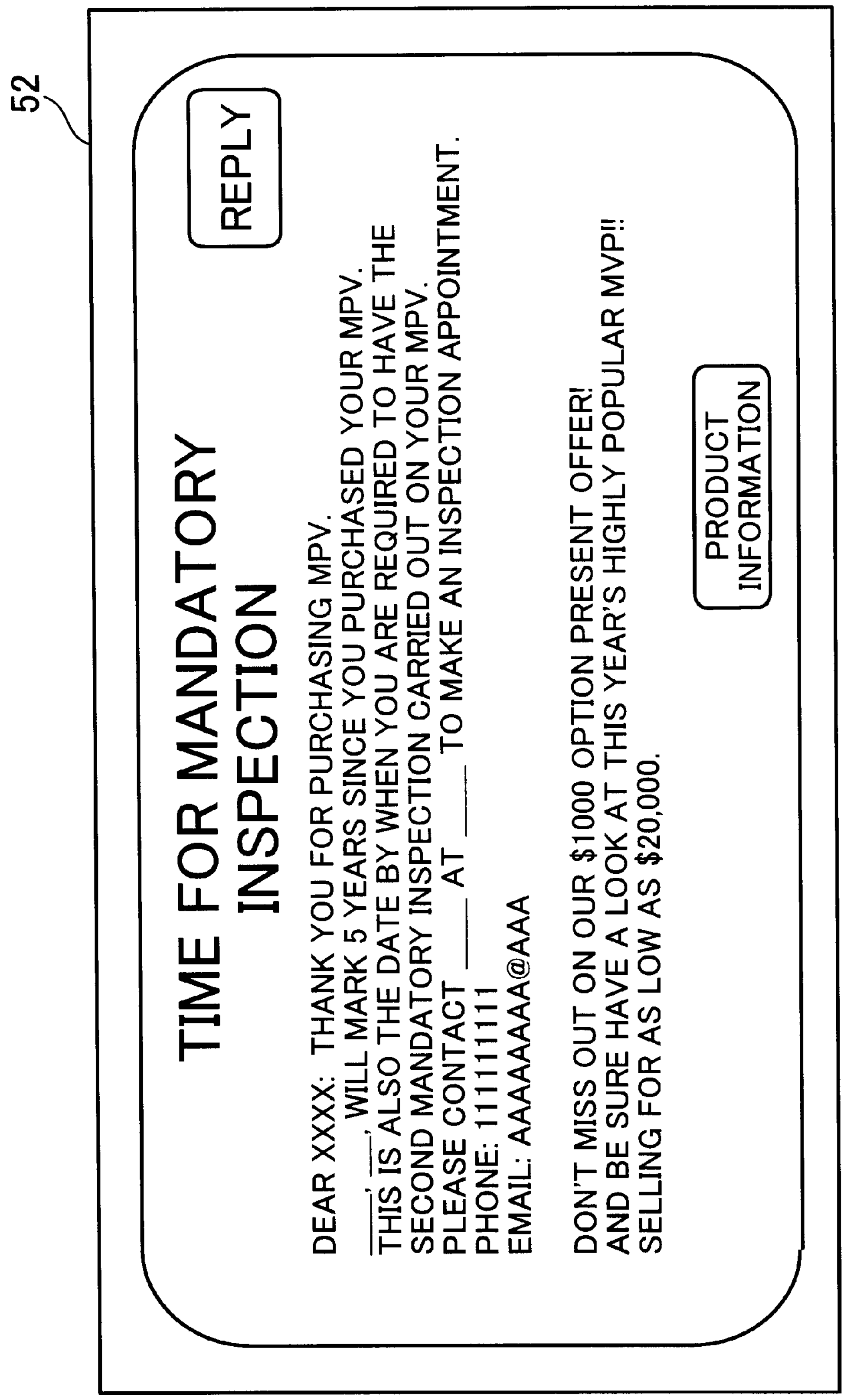
FIG. 5 is a diagram showing an example of a "Mandatory Inspection Date Near" notice shown on an onboard display in accordance with an embodiment of the present invention.

The particulars of the service the information center provides an owner who contracted for "Periodic Inspection/Expendable Parts Report" will now be explained with reference to FIG. 5.

Information regarding an owner (customer) who has concluded an agreement is stored in the database 20 storing owner information. The information center 2 uses this stored customer information as the basis for periodically emailing various information to the owner's computer 38 or the onboard computer of the vehicle 36.

When, for example, the time for a mandatory inspection of the owner's vehicle arrives, the information center 2 sends the owner a mandatory inspection date report. FIG. 5 shows and example of a "Time for Mandatory Inspection" notice received by the owner and displayed, for example, on the display 52 of the onboard computer 40. Reports regarding checkups other than the mandatory inspection (periodic inspection) are also sent to the owner in a similar format.

An expendable part notice is prepared utilizing data regarding the results, time, mileage etc. stored in the owner information database 20 when the owner had a periodic inspection performed. Specifically, the times for various oil changes, tire replacement and the like are determined based on past periodic inspection dates, the vehicle mileage and other such information. As each time arrives, the information center 2 emails an expendable part report to the owner computer 38 or the onboard computer of the owner's vehicle 36.

Since periodic inspection and expendable part reports are thus issued based on owner information stored in the database 20, the owner can be supplied with accurate information at appropriate times.

The particulars of the service the information center 2 (remote troubleshooting server 6) provides an owner who contracted for "Vehicle Online Troubleshooting" will now be explained with reference to FIG. 6.

Figure 6:
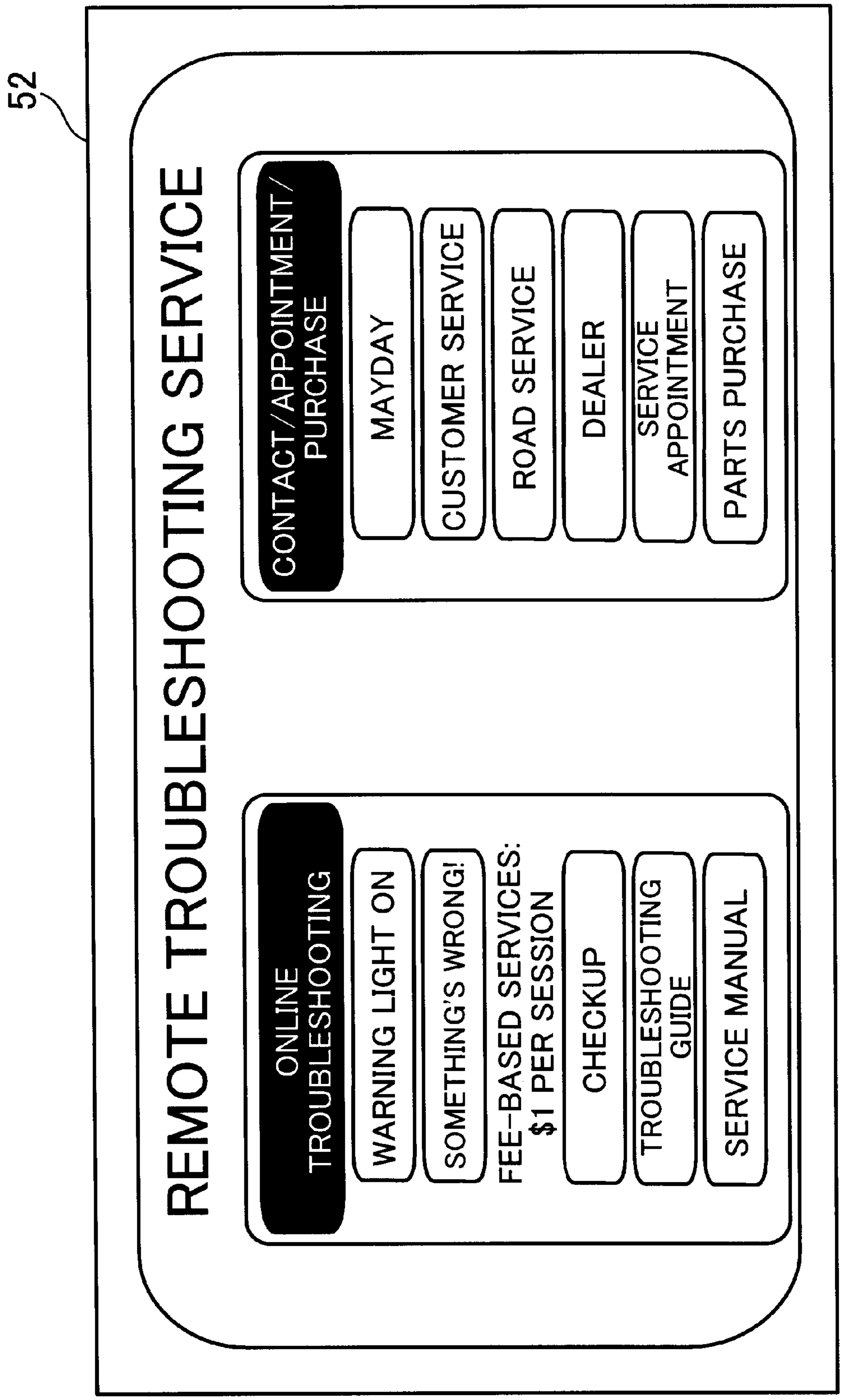
FIG. 6 is a diagram showing an example of an initial screen that appears on the onboard display when remote troubleshooting is conducted in accordance with an embodiment of the present invention.

FIG. 6 is an initial screen that appears on the display 52 when an owner who contracted for "Vehicle Online Troubleshooting" uses the onboard computer 40 to perform remote troubleshooting or the like.

The initial screen is a menu of items required for carrying out remote troubleshooting and the like. The menu is divided into a sub-menu titled "Contact/Appointment/Purchase" and a sub-menu titled "Online Troubleshooting." The "Contact/Appointment/Purchase" submenu includes the items: "Mayday," "Customer Service," "Road Service," "Dealer," "Service Appointment" and "Parts Purchase"

The owner selects "Mayday" upon becoming involved in an accident in order to contact police/fire department 34 over the Internet 28 via a GPS and a mayday dedicated server (neither shown). Some newer model vehicles are designed so that when an air bag activates "Mayday" is automatically selected and the accident reported. "Customer Service" is for sending requests and comments to the vehicle manufacture, "Road Service" is for contacting a road service provider for assistance, "Dealer" is for contacting the dealer from which the vehicle was purchased, and "Service Appointment" and "Parts Purchase" are for contacting the dealer or an auto service shop to making an appointment for servicing (repair or periodic inspection) or to purchase a part.

The "Online Troubleshooting" sub-menu includes the items: "Warning Lamp ON," "Something's Wrong!," "Checkup," "Troubleshooting Guide" and "Service Manual." Selection of "Warning Lamp ON" or "Something's Wrong!" does not result in any additional fee but a fee of $1 per session is charged when "Checkup," "Troubleshooting Guide" or "Service Manual" is selected.

The owner selects "Warning Lamp ON" when some vehicle component has actually failed. In this case, remote troubleshooting is conducted using the first troubleshooting program explained later (see FIG. 7).

The owner selects "Something's Wrong!" upon sensing something unusual about the vehicle (odd smell, noise or the like). Whether or not the vehicle has actually experienced a malfunction is uncertain. In this case, remote troubleshooting is conducted using the trouble site pinpointing program (see FIGS. 9 to 13).

By selecting "Checkup," the owner can have his or her vehicle inspected on line, without having to visit an auto service shop. When a checkup is to be performed, the data regarding the vehicle auxiliary equipment 49 and vehicle dynamics system 50 already collected by the onboard computer 40 as explained in the foregoing are transmitted to the information center 2, and the remote troubleshooting server 6 at the information center 2 utilizes these data and the second troubleshooting program (explained later) to conduct an exhaustive vehicle inspection. The owner can therefore readily obtain a detailed vehicle checkup, such as before set off on a long trip.

"Troubleshooting Guide" is selected when it is desired to perform an inspection with regarding to a troubleshooting item (inspection item) that requires an inspection only the owner can conduct, such as an engine oil inspection. When "Troubleshooting Guide" is selected inspection steps to be carried out by the owner are displayed on the display 52 of the onboard computer 40. The owner conducts the inspection following the displayed directions, after detaching the display 52 from the vehicle if necessary. Data regarding the result of the inspection are transmitted to the remote troubleshooting server 6 at the information center 2, which conducts a diagnosis.

When "Service Manual" is selected, a service manual including a wiring diagram and the like is displayed on the display 52 of the onboard computer 40.

The particulars of remote troubleshooting using troubleshooting programs will now be explained.

The troubleshooting programs used for remote troubleshooting include the first troubleshooting program for conducting trouble analysis when a malfunction occurs (see FIG. 7), the second troubleshooting program for conducting periodic inspections and the like (see FIG. 8), and the trouble site pinpointing program for conducting trouble analysis when the owner perceives a malfunction (see FIGS. 9 to 13). The features of these troubleshooting programs are comprehensively explained in the following.

These troubleshooting programs are not for simply determining what particular vehicle component is bad but are relatively large programs also capable of conducting detailed trouble analysis and inspection for determining the nature of specific component malfunctions. The troubleshooting programs are therefore transmitted from the remote troubleshooting server 6 at the information center 2 over the Internet 28 to the vehicle 36 for temporary storage in the memory device 53 of the onboard computer 40 only when required. Since this eliminates the need for the vehicle side to constantly store large-volume programs, the capacity of memory device 53 can be reduced.

The troubleshooting programs, i.e., the first troubleshooting program, second troubleshooting program and trouble site pinpointing program, are thus temporarily stored in the memory device 53 of the onboard computer 40 in this embodiment. However, this invention is not limited to this arrangement and it is instead possible to preinstall the core functions of the troubleshooting programs in the memory device 53 of the onboard computer 40 and, when necessary, transmit only differential programs from the remote troubleshooting server 6 at the information center 2 to the vehicle 36 over the Internet 28 for temporary or permanent storage in the memory device 53 of the onboard computer 40. The differential programs of the troubleshooting programs are versions that have been updated based on the problem data and the like stored on the vehicle side.

Otherwise the individual troubleshooting programs uploaded from the remote troubleshooting server 6 at the information center 2 to the vehicle 36 via the Internet 28 may be permanently installed in the memory device 53 of the onboard computer 40.

As mentioned earlier, the troubleshooting programs are periodically updated to incorporate the data stored in database 22 (see FIG. 1) regarding past model-specific problems and the like. Malfunctions that the particular model being diagnosed is apt to experience can therefore be easily and accurately determined.

In order to enable vehicle trouble analysis and inspection, moreover, the troubleshooting programs incorporate features for putting the vehicle in a condition enabling inspection. For example, they can, automatically or with owner assistance, as circumstances require, start the engine in order to troubleshoot the RPM sensor, drive the vehicle in order to troubleshoot the vehicle speed sensor, and turn the air-conditioning system on and off in order to troubleshoot its performance.

While the troubleshooting performed using the troubleshooting program can be carried out on all vehicle equipment, if desired, the owner can instead, as required, designate specific components/systems to be subjected to troubleshooting.

The data acquired by executing the troubleshooting program are collected on the vehicle side and forwarded to the remote troubleshooting server 6. The remote troubleshooting server 6 conducts trouble analysis and inspection based on the collected data.

The trouble analysis results and inspection results are stored in the databases 20 and 22 (see FIG. 1) in association with the model concerned for use in future troubleshooting.

The particulars of remote troubleshooting performed using the first troubleshooting program, which is executed to conduct trouble analysis when a malfunction occurs, will now be explained with reference to FIG. 7. The symbol S preceding a numeral in FIG. 7 denotes a "step." S1, 2, 7, 8, 11, 12 and 16 are executed on the vehicle side. The other steps are executed by the remote troubleshooting server 6 at the information center 2.

First, in S1, a trouble notification instruction is entered on the vehicle side. This is done such as by selecting "Warning Light ON" in the menu of FIG. 6 and represents a case where a problem has clearly occurred somewhere in the vehicle equipment. Next, in S2, a trouble code is transmitted from the vehicle to the server. Trouble codes are defined for different malfunctions beforehand. The transmitted trouble code is the one that the central control unit 41 of the onboard computer 40 uses to specify the trouble site etc. based on irregularity information from the auxiliary equipment 49, vehicle dynamics system 50 etc. The transmission of the trouble code can be done automatically or at the owner's discretion.

The server receives the trouble code in S3, identifies the received trouble code in S5 based on the data stored in the database 22 (see FIG. 1), and decides whether a detailed inspection of the trouble is necessary in S5. When it is found that a detailed is unnecessary and that the nature of the trouble is evident from the trouble code, control goes directly to S10, without passing through S6–9, i.e., without transmitting the first troubleshooting program to the vehicle.

When a detailed inspection is required, control goes to S6, in which the server transmits the first troubleshooting program to the vehicle. The first troubleshooting program, which is used to conduct trouble analysis, incorporates the features explained earlier.

Next, in S7 executed on the vehicle side, the received first troubleshooting program is temporarily stored in the memory device 53 and then executed by the onboard computer 40 to carry out a detailed inspection based on the trouble site etc. specified by the trouble code. Then, in S8, the inspection results are transmitted to the server.

The relationship between the trouble codes and the first troubleshooting program will now be explained more specifically. Say, for instance, that the trouble code designates "vehicle speed error." From the trouble code alone, it is uncertain whether the vehicle speed error is the result of a bad vehicle speed sensor, a faulty CPU, or a problem with a cable line. In order to determine the cause of the vehicle speed error, the first troubleshooting program inspects the vehicle speed sensor, checks whether the CPU is faulty by exchanging signals with the CPU, and checks for cable line trouble by determining whether other CPUs are receiving vehicle speed signal input.

The first troubleshooting program may be either one capable of dealing with all trouble codes or one capable of conducting inspections only with regard to a specific trouble code or codes transmitted from the vehicle to the server.

Next, in S9, the server uses the model-specific data stored in the database 22 (see FIG. 1) to analyze the inspection data and determine the nature of the trouble. Then, in S10, the server transmits the inspection results (trouble particulars) to the vehicle. When detailed inspection was found to be unnecessary in S5, the inspection results (trouble particulars) obtained in S4 are sent to the vehicle in S10.

In S11, the vehicle receives the inspection results (trouble particulars) and then, in S12, makes a servicing appointment with and/or places a parts order with the server.

In S13, the server accepts the servicing appointment and/or parts order and then, in S14, makes a servicing appoint and/or places a parts order with the dealer 10 and/or the auto service shop 12 and/or the parts factory 14 via the network 4. Next, in S15, the server sends the vehicle a confirmation of the servicing appointment and/or parts order.

Then, in S16, the vehicle receives the servicing appointment and/or parts order confirmation from the server, and the troubleshooting using the first troubleshooting program is terminated.

Upon completion of the remote troubleshooting, the server does not discard the troubleshooting data but stores them in the databases 20, 22 (FIG. 1) for use in future troubleshooting.

In the routine explained with reference to FIG. 7, the vehicle transmits trouble codes to the remote troubleshooting server 6. However, this embodiment is not limited to this arrangement. Specifically, instead of trouble codes, the vehicle may transmit to the remote troubleshooting server 6 the vehicle data that are input to the central control unit 41 of the onboard computer 40 from the vehicle auxiliary equipment 49 and vehicle dynamics system 50. In this case, similarly to the procedure shown in FIG. 7, the remote troubleshooting server 6 does not transmit the first troubleshooting program to the vehicle when the nature of the trouble can be ascertained from the vehicle data alone. Rather, S6–9 are skipped and S10 and the ensuing steps are executed. On the other hand, when the nature of the trouble cannot be ascertained from the vehicle data alone, the first troubleshooting program is transmitted to the vehicle in S6 and the following steps are executed in the manner already explained.

The particulars of remote troubleshooting performed using the second troubleshooting program, which is executed to conduct periodic inspections and the like, will now be explained with reference to FIG. 8. The symbol T preceding a numeral in FIG. 7 denotes a "step." T1, 4, 5, 8, 9 and 13 are executed on the vehicle side. The other steps are executed by the remote troubleshooting server 6 at the information center 2.

First, in T1 executed on the vehicle side, an inspection date and inspection items are registered. This registration is included in the case where a vehicle periodic inspection is conducted or "Checkup" (see FIG. 6) is selected. The vehicle is inspected for malfunctions and a detailed inspection is conducted if any are found.

Next, in T2 executed on the server side, it is checked whether the inspection date has arrived. When the result is affirmative, control goes to T3, in which the second troubleshooting program is transmitted to the vehicle. The second troubleshooting program is also transmitted in the case where "Checkup" was selected (see FIG. 6).

The second troubleshooting program, which is used to conduct trouble analysis, incorporates the features explained earlier. Like the first troubleshooting program, the second troubleshooting program includes features for conducting detailed inspections, and is further capable of collecting data regarding mileage, oil level, oil deterioration, brake pad thickness, tire air pressure, air-conditioner coolant level, and the like.

Next, in T4 executed on the vehicle side, the received second troubleshooting program is temporarily stored in the memory device 53 and then executed by the onboard computer 40 to carry out a detailed inspection. Then, in T5, the inspection results are transmitted to the server.

Next, in T6, the server uses the model-specific data stored in the database 22 (see FIG. 1) to analyze the inspection data and determine the nature of the trouble. Then, in T7, the server transmits the inspection results (trouble particulars) to the vehicle.

In T8, the vehicle receives the inspection results and then, in T9, makes a servicing appointment and/or places a parts order with the server.

In T10, the server accepts the servicing appointment and/or parts order and then, in T11, makes a servicing appoint and/or places a parts order with the auto service shop 12 and parts factory 14 via the network 4. Next, in T12, the server sends the vehicle a confirmation of the servicing appointment and/or parts order.

Then, in T13, the vehicle receives the servicing appointment and/or parts order confirmation from the server, and the troubleshooting using the first troubleshooting program is terminated.

Upon completion of the remote troubleshooting using the second troubleshooting program, the server does not discard the troubleshooting data but stores them in the databases 20, 22 (see FIG. 1) for use in future troubleshooting.

The particulars of the remote troubleshooting performed using the trouble site pinpointing program, which is used when the owner feels that something may be wrong, will now be explained with reference to FIGS. 9 to 13. The troubleshooting using trouble site pinpointing program is for finding problems (spotting trouble source) that cannot be found with the first troubleshooting program and second troubleshooting program. It is the remote troubleshooting conducted when the owner selects "Something's Wrong!" in FIG. 6.

Figure 7:
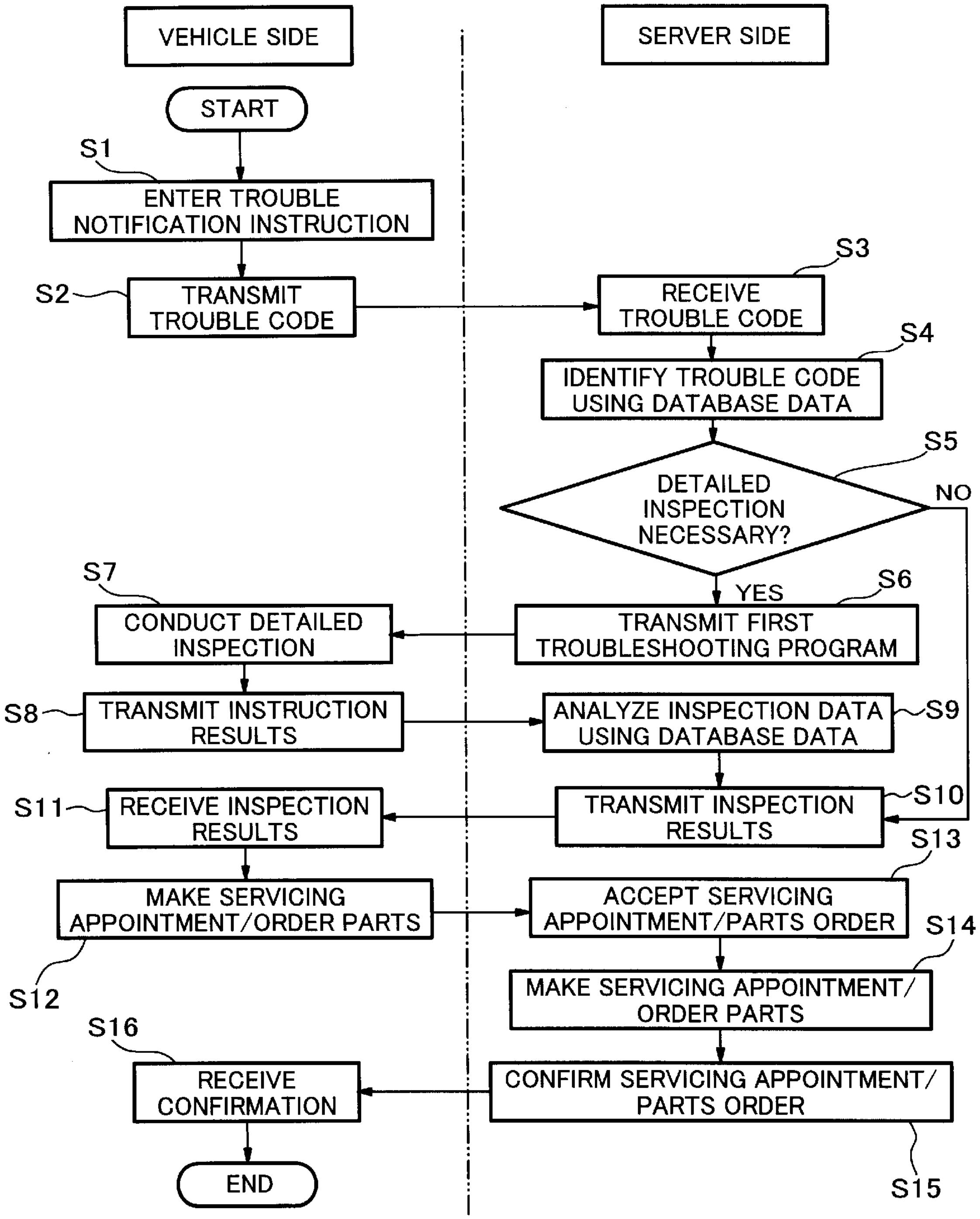
FIG. 7 is a flowchart showing particulars of remote troubleshooting using a first troubleshooting program according to an embodiment of the present invention.
Figure 8:
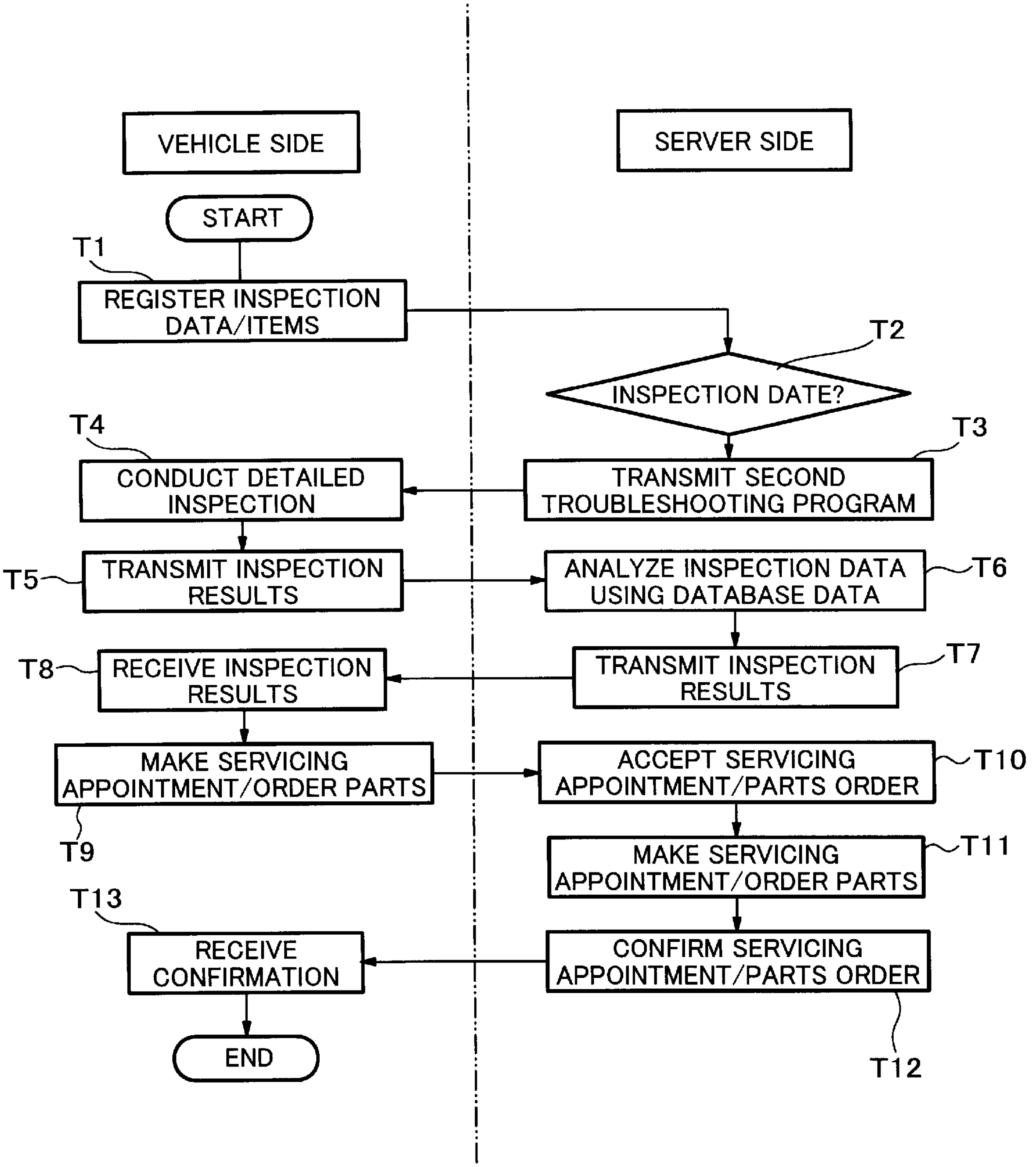
FIG. 8 is a flowchart showing particulars of remote troubleshooting using a second troubleshooting program according to an embodiment of the present invention.

The remote troubleshooting using the trouble site pinpointing program is initiated similarly to the troubleshooting shown in FIGS. 7 and 8. Specifically, the remote troubleshooting server 6 at the information center 2 responds to a request from the vehicle side by transmitting the trouble site pinpointing program to the vehicle, where troubleshooting is performed using the transmitted trouble site pinpointing program.

Figure 9:
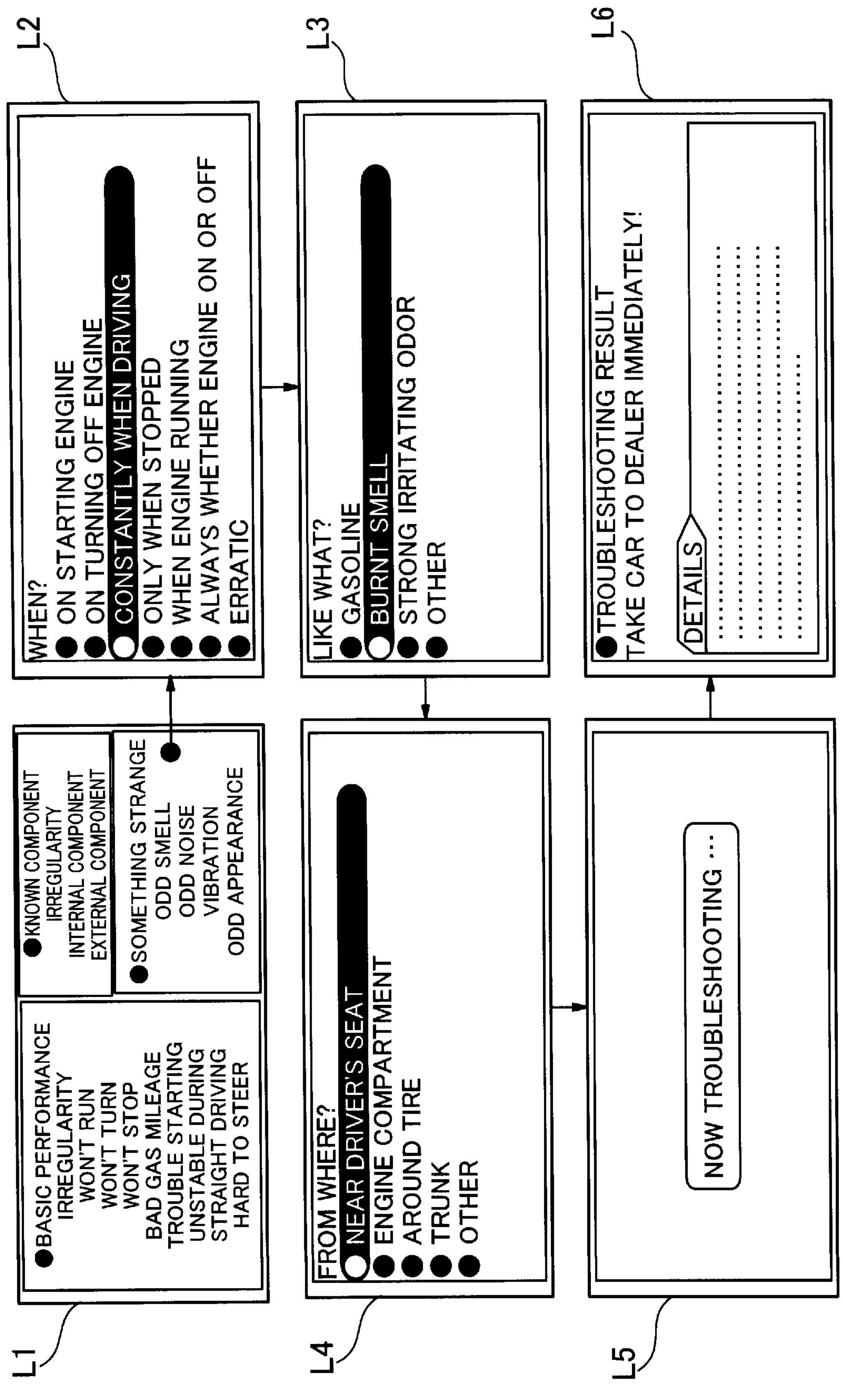
FIG. 9 is a diagram showing hierarchically formatted screens that appear on the onboard display in a first example of remote troubleshooting using a trouble site pinpointing program in accordance with an embodiment of the present invention.

To begin with, a first example of the remote troubleshooting using the trouble site pinpointing program will be explained with reference to FIG. 9. FIG. 9 shows a first example of remote troubleshooting using the trouble site pinpointing program. The symbol L preceding a numeral in FIG. 9 denotes a screen that appears on the display 52 of the onboard computer 40. The screens shown in FIG. 9 are displayed on the display 52 in a hierarchical format. The screens shown in FIGS. 10 to 13 are similarly formatted.

When "Something's Wrong" is selected in the screen shown in FIG. 6, the trouble site pinpointing program is transmitted from the remote troubleshooting server 6 to the vehicle. The transmitted trouble site pinpointing program displays the screen L1 shown in FIG. 9 on the display 52 of the onboard computer 40. As shown in screen L1, the troubles to be determined are classified into three groups: "Basic Performance Irregularity," "Known Component Irregularity," and "Something Unusual."

Problem categories under "Basic Performance Irregularity" include "Won't run," "Won't turn," "Won't stop," "Bad gas mileage," "Trouble starting," "Unstable during straight driving," and "Hard to steer."

Problem categories under "Known Component Irregularity" include "Internal component" and "External component."

Problem categories under "Something Strange" are ones sensed by the owner: "Odd smell," "Odd noise," "Vibration," and "Odd appearance"

This first example takes up the case where "Odd smell" under "Something Strange" is selected.

These "problem categories" and the "choices" (discussed later) are defined separately for each model of owner vehicle to be troubleshot and are updated from time to time. This is possible because the database 22 of FIG. 1 stores complaint and problem data gathered from customers separately for each vehicle model. These data are used to define the problem categories and choices for each model, taking into account the complaints and problems most often heard regarding the model concerned. This makes it possible to carry out the troubleshooting based on empirically established problem categories and choices matched to the troubles that the model being subjected to the troubleshooting is most likely to experience. Troubleshooting can therefore be conducted easily with high accuracy. The same can be said regarding the examples illustrated in FIGS. 9 to 13.

When "Odd smell" is selected in screen L1, screen L2 appears. Screen L2 contains the question "When?" and gives as reply choices: "On starting engine," "On turning off engine," "Constantly when driving," "Only when stopped," "When engine running," "Always whether engine on or off," and "Erratic." In this first example, "Constantly when driving" is selected.

This selection brings up screen L3. Screen L3 contains the question "Like what?" and gives as reply choices: "Gasoline," "Burnt smell," "Strong irritating odor," and "Other." These choices are ones established based data stored in the database 22. Let the selection in screen L3 be "Burnt smell."

This brings up screen L4. Screen L4 contains the question "From where?" and gives as reply choices: "Near driver's seat," "Engine compartment," "Around tire," "Trunk," and "Other." Let the selection in screen L4 be "Near driver's seat."

This brings up screen L5 displaying the message: "Now troubleshooting . . . ," informing the owner that troubleshooting is in progress. The troubleshooting at this time is performed by the remote troubleshooting server 6 using the trouble site pinpointing program stored in the database 26.

Upon completion of the troubleshooting, screen L6 setting out the results of the troubleshooting appears. In this example the particulars of the results are set out under "Details," preceded by the message: "Take car to dealer immediately!"

An explicit problem coming under the first example shown in FIG. 9 would be an electrical short near the driver's seat.

Upon completion of the remote troubleshooting using the trouble site pinpointing program shown in FIG. 9, the server does not discard the troubleshooting data but stores them in the databases 20, 22 for use in future troubleshooting.

Similarly to in the first embodiment explained with reference to FIGS. 7 and 8, the remote troubleshooting server 6 at the information center 2 also informs the auto service shop 12 and/or the parts factory 14 of the inspection results obtained by the remote troubleshooting using the trouble site pinpointing program and makes an appointment for servicing and/or places a part order.

Although not mentioned in the forgoing explanation of the first example, if the owner selects "Odd noise" in screen L1, various odd noises are produced when screen L3 opens and the owner can select the noise that is closet to the noise he or she actually hears. The same is true in the second to fifth examples.

Figure 10:
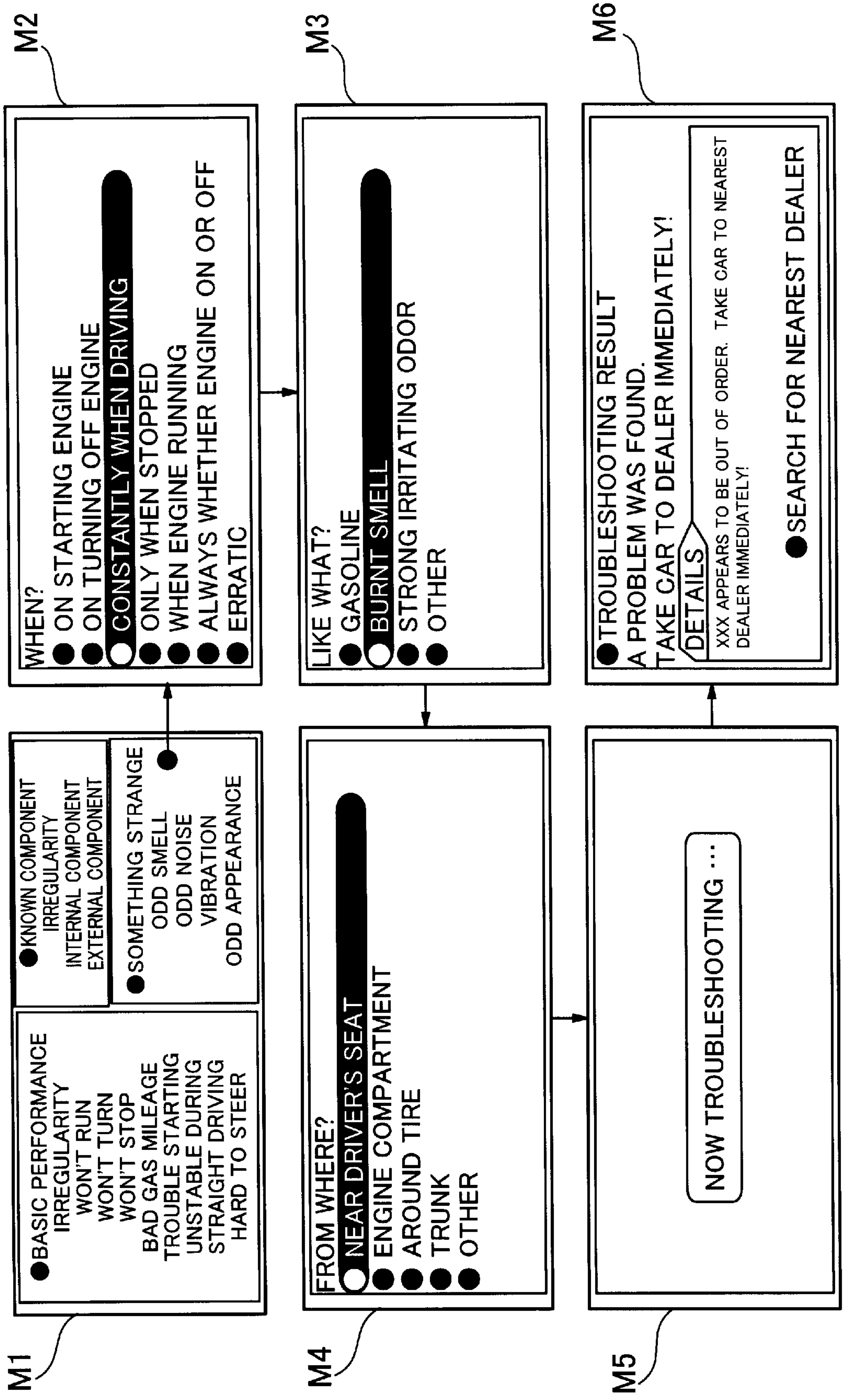
FIG. 10 is a diagram showing hierarchically formatted screens that appear on the onboard display in a second example of remote troubleshooting using a trouble site pinpointing program in accordance with an embodiment of the present invention.

A second example of remote troubleshooting using the trouble site pinpointing program is shown in FIG. 10. Screens M1 to M5 in FIG. 10 are the same as screens L1 to L5 in FIG. 9, but screen M6 differs from screen L6. In this second example, the screen M6 that appears to inform the owner of the troubleshooting result includes the message "A problem was found. Take car to dealer immediately!" and, under "Details," the notice "xxx appears to be out of order. Take car to nearest dealer immediately!"

By selecting "Search for nearest dealer" in screen M6, the owner can inform the database 20 or auto service shop 12 of the troubleshooting result via the remote troubleshooting server 6 and simultaneously make arrangements for repair.

Figure 11:
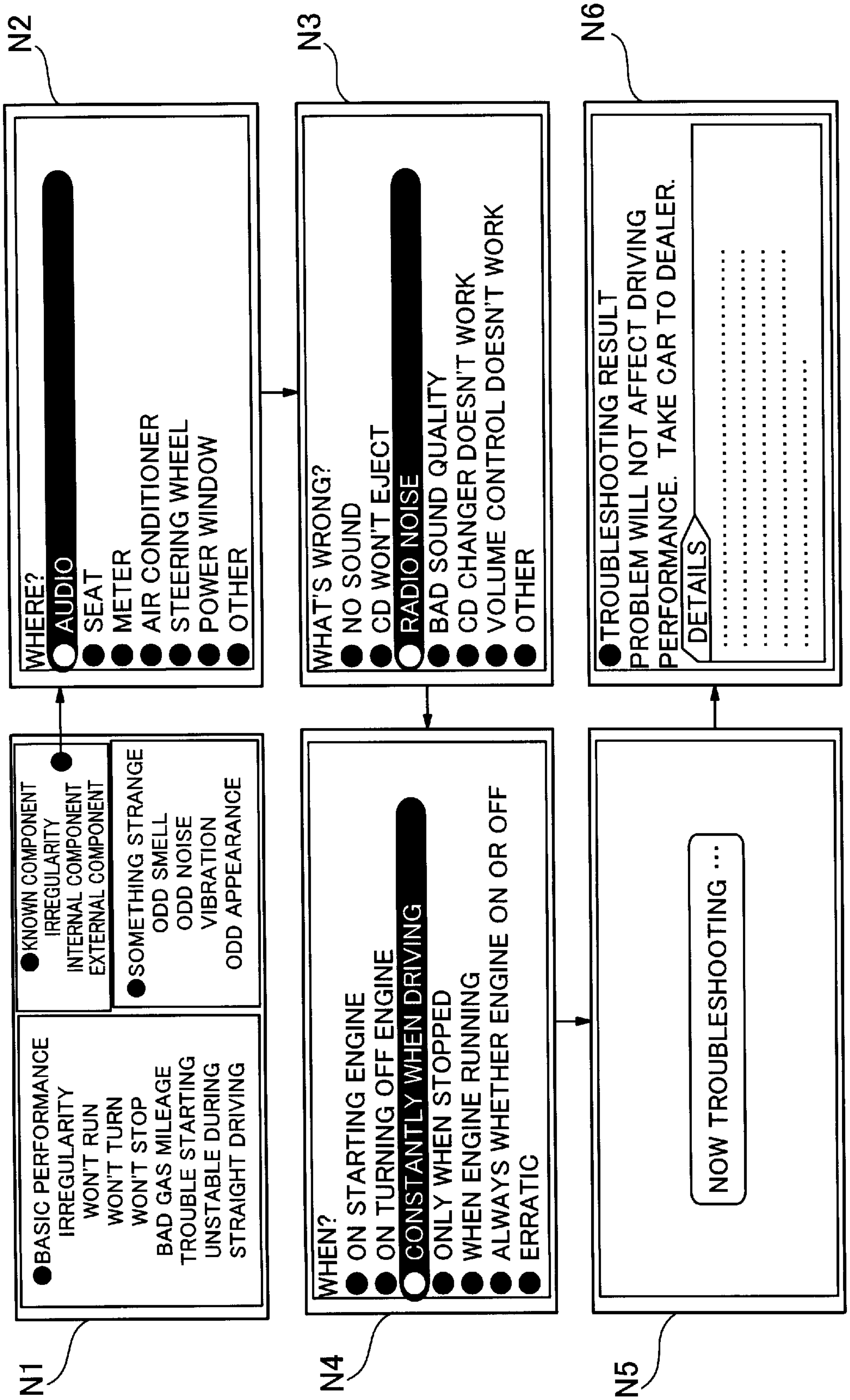
FIG. 11 is a diagram showing hierarchically formatted screens that appear on the onboard display in a third example of remote troubleshooting using a trouble site pinpointing program in accordance with an embodiment of the present invention.

A third example of remote troubleshooting using the trouble site pinpointing program is shown in FIG. 11. In this third example, the owner selects "Internal component" under "Known Component Irregularity" in screen N1, "Audio" in screen N2, "Radio noise" in screen N3, and "Constantly when driving" in screen N4. Based on these choices, experience-based troubleshooting is conducted using the stored data. At this time, screen N5 opens with the message "Now troubleshooting . . . " to notify the owner that troubleshooting is in progress and screen N6 then opens to display the troubleshooting result. In this third example, the result shown in screen N6 includes the message "Problem will not affect driving performance. Take car to dealer," followed by particulars set out under "Details." Explicit problems coming under this third example shown in FIG. 11 would be noise picked up from the alternator or a bad ground connection.

Figure 12:
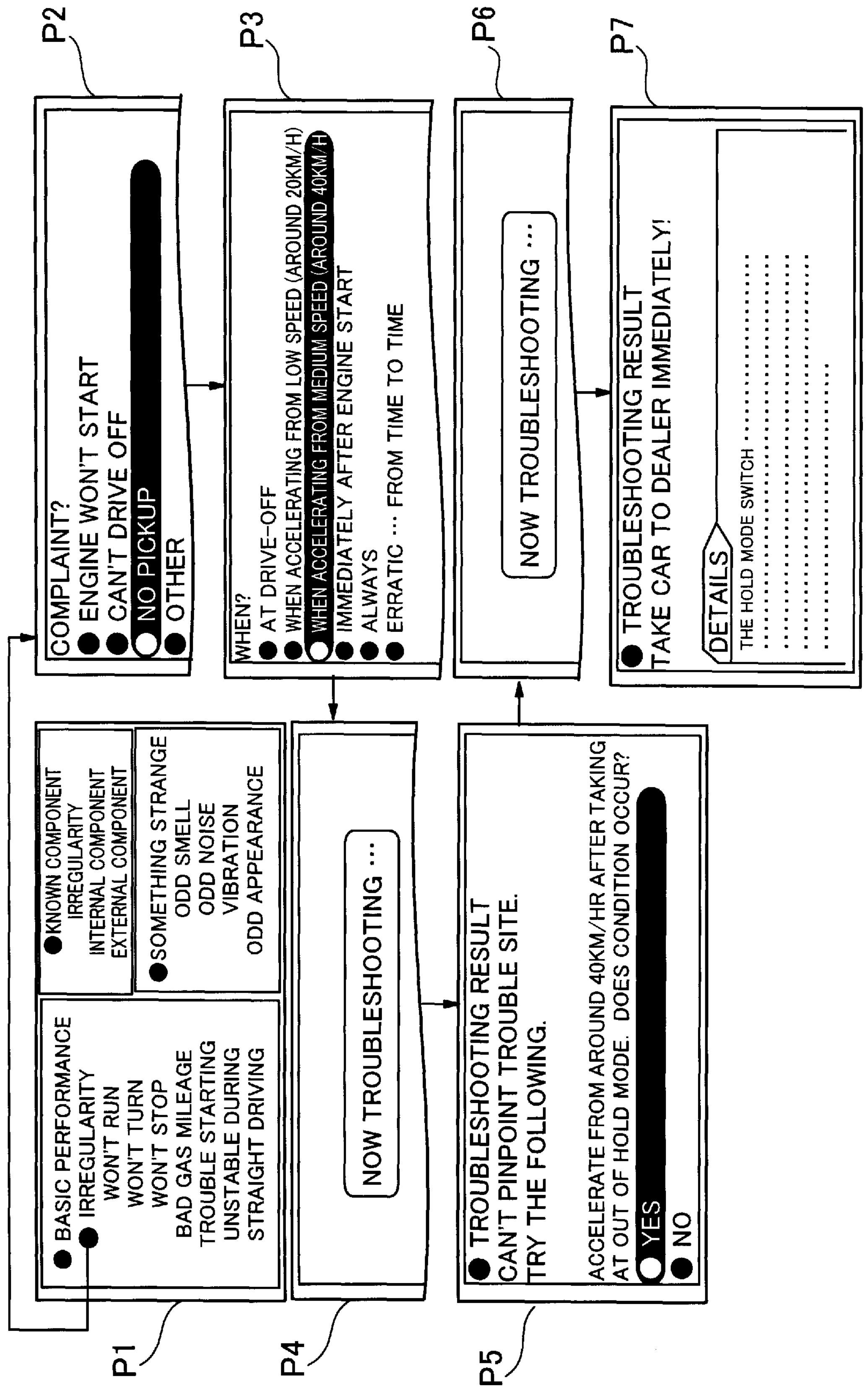
FIG. 12 is a diagram showing hierarchically formatted screens that appear on the onboard display in a fourth example of remote troubleshooting using a trouble site pinpointing program in accordance with an embodiment of the present invention.

A fourth example of remote troubleshooting using the trouble site pinpointing program is shown in FIG. 12. In this fourth example, the owner selects "Won't run" under "Basic Performance Irregularity" in screen P1, "No pickup" in screen P2, and "When accelerating from medium speed (around 40 km/h)" in screen P3. Based on these choices, experience-based troubleshooting is conducted using the stored data. At this time, screen P5 opens with the message "Now troubleshooting . . . " to notify the owner that troubleshooting is in progress and screen P5 then opens to display the troubleshooting result. In this fourth example, the circumstances do not permit the troubleshooting to come to a final conclusion. Screen P5 therefore opens with the instruction and question: "Accelerate from around 40 km/hr after taking AT out of hold mode. Does condition occur?" The owner then operates the vehicle as instructed to determine whether the condition occurs. In this example, the answer is "Yes."

The troubleshooting is then repeated based on the question and the reply received, during which time screen P6 appears with the message "Now troubleshooting . . . " Before long, screen P7 appears with the message "Take car to dealer immediately," followed by pertinent particulars set out under "Details." An explicit problem coming under this fourth example would be a broken hold mold switch.

Figure 13:
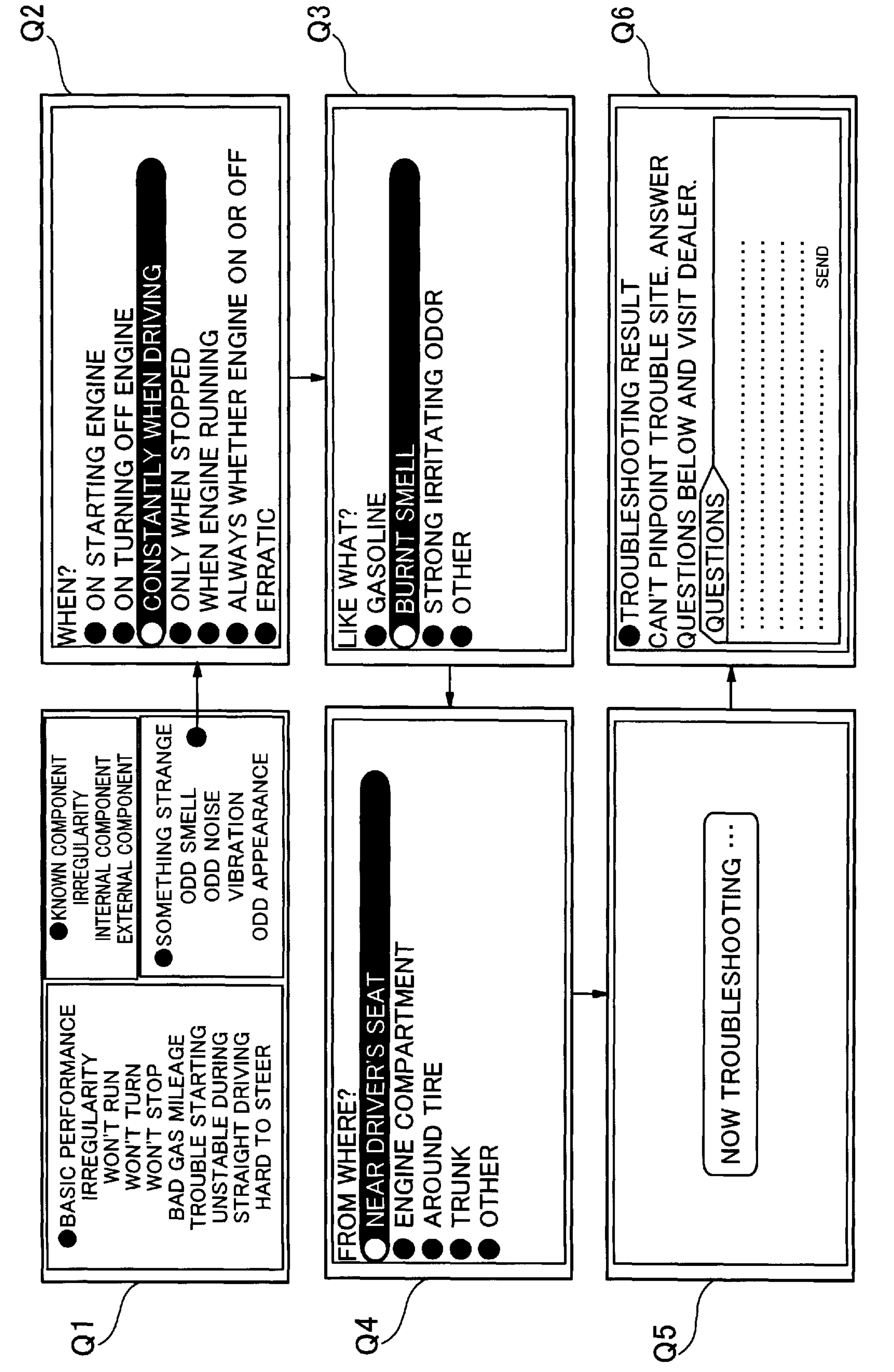
FIG. 13 is a diagram showing hierarchically formatted screens that appear on the onboard display in a fifth example of remote troubleshooting using a trouble site pinpointing program in accordance with an embodiment of the present invention.

A fifth example of remote troubleshooting using the trouble site pinpointing program is shown in FIG. 13. In this fifth example, the owner selects "Internal component" under "Known Component Irregularity" in screen Q1, "Audio" in screen N2, "Radio noise" in screen Q3, and "Constantly when driving" in screen Q4. Based on these choices, experience-based troubleshooting is conducted using the stored data. At this time, screen Q5 opens with the message "Now troubleshooting . . . " to notify the owner that troubleshooting is in progress and screen Q6 then opens to display the troubleshooting result. In this fifth example, the result shown in screen Q6 includes the message "Can't pinpoint trouble site. Answer questions below and visit dealer," followed by a number of specific questions for the owner to answer under "Questions." The owner replies to the questions and sends the answers to the remote troubleshooting server 6. The troubleshooting result and the answers are then forwarded to the dealer 10 and the auto service shop 12. In addition, a servicing appointment is made and a parts order placed.

In the remote troubleshooting using the trouble site pinpointing program explained in the foregoing, a hierarchical classification is established that starts with the three irregularity categories "Basic Performance Irregularity," "Known Component Irregularity" and "Something Strange" and continues with multilevel "choice" items corresponding to classified trouble items. The trouble site is determined by troubleshooting conducted in response to the items selected by the owner. In this remote troubleshooting using the trouble site pinpointing program, the irregularity categories and choices are defined based on complaints and problems reported by vehicle purchasers and stored in the database 22 in association with individual models. Malfunctions that the particular model being diagnosed is apt to experienced can therefore be easily and accurately determined.

The contents of the "Troubleshooting Guide" indicated in FIG. 6, which is for instructing the owner in how to conduct certain types of inspection and maintenance, will now be explained with reference to FIGS. 6 and 14 to 17.

Figure 14:
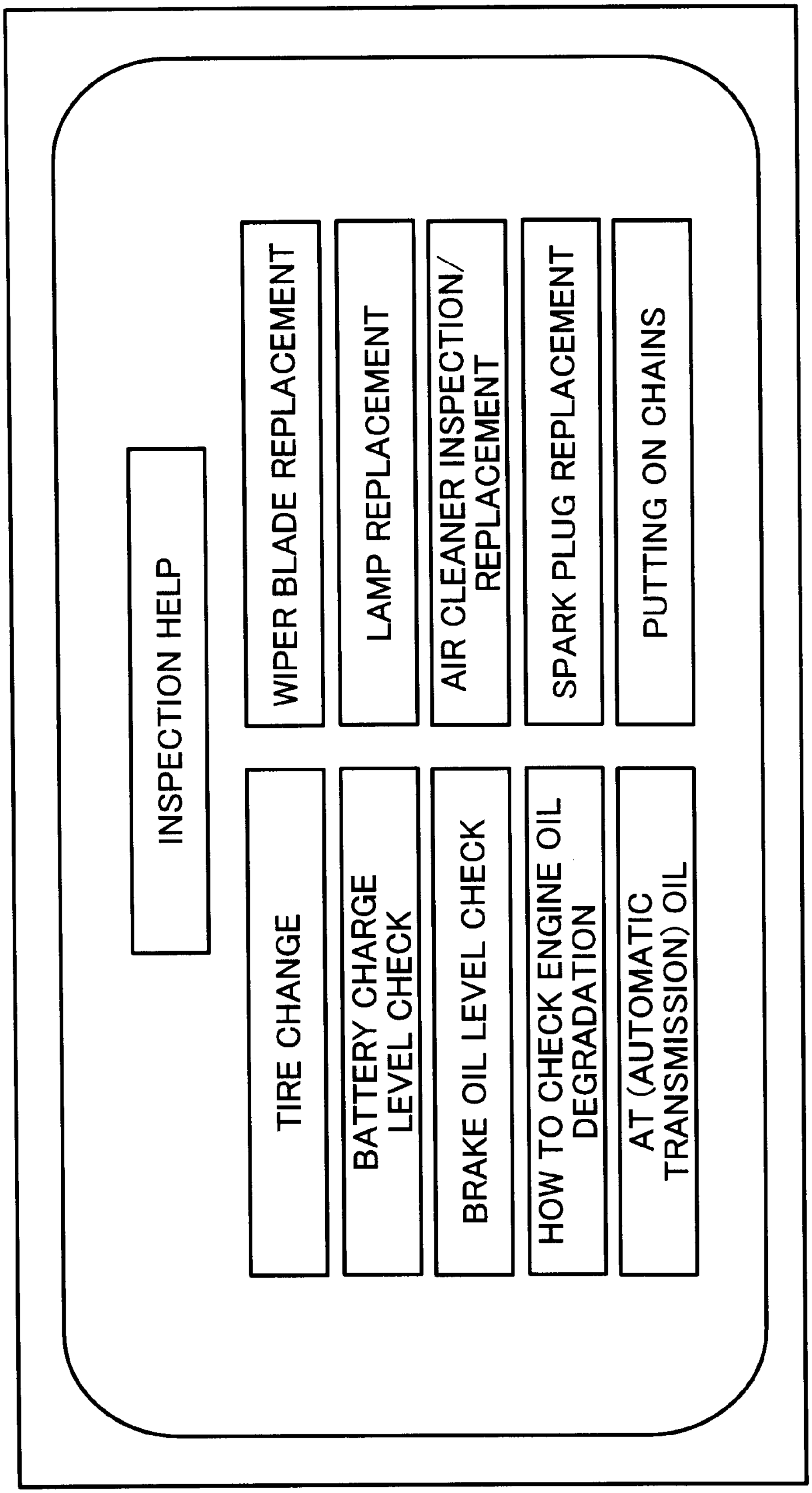
FIG. 14 is a diagram showing an "Inspection Help" screen shown on the onboard display when the owner performs inspection following a "Troubleshooting Guide" according to an embodiment of the present invention.

When an owner who has concluded the agreement explained earlier selects "Troubleshooting Guide" from the screen of FIG. 6 appearing on the display 52, the screen of FIG. 14 appears.

The screen of FIG. 14 is an "Information Help" menu containing the items: "Tire change," "Battery charge level check," "Brake oil level check," "How to check engine oil degradation," "AT (automatic transmission) oil," "Wiper blade replacement," "Lamp replacement," "Air cleaner inspection/replacement," "Spark plug replacement," and "Putting on chains."

Owner assistance using this troubleshooting guide is carried out in a manner similar to the first and other troubleshooting programs explained above. Upon receiving an owner request, the remote troubleshooting server 6 at the information center 2 uploads a troubleshooting guide program to the owner's onboard computer 40 over the Internet 28. The troubleshooting guide program provides the owner with guidance in how to carry out various inspection and maintenance procedures using images and voice. The troubleshooting guide program is therefore relatively large. It is therefore sent from the remote troubleshooting server 6 at the information center 2 to the vehicle 36 for temporary storage in the memory device 53 of the onboard computer 40 only when required. Since this eliminates the need for the vehicle side to constantly store a large-volume program, the capacity of memory device 53 can be reduced. The fee for using the troubleshooting guide is $1 per time (session) as indicated in FIG. 6.

The images used in the troubleshooting guide program are easy for the owner to understand because they depict the same vehicle model as the one the owner is inspecting and doing maintenance on.

As pointed out earlier, the display 52 of the onboard computer 40 is detachable from the vehicle. When conducting inspection and maintenance, therefore, the owner or the owner's assistant can carry the display to a convenient location and proceed with the work while watching the pictures that appear on the display 52 and listening to the voice instructions.

Although the troubleshooting guide program is temporarily stored in the memory device 53 of the onboard computer 40 in this embodiment, the invention is not limited to this arrangement and it is instead possible to preinstall the core functions of the troubleshooting guide program in the memory device 53 of the onboard computer 40 and, when necessary, transmit only differential programs from the remote troubleshooting server 6 at the information center 2 to the vehicle 36 over the Internet 28 for temporary or permanent storage in the memory device 53 of the onboard computer 40. The troubleshooting guide program is progressively stored in the memory device 53 of the onboard computer 40 as it is transmitted from the remote troubleshooting server 6 at the information center 2 to the vehicle 36 side over the Internet 28.

Otherwise the troubleshooting program uploaded from the remote troubleshooting server 6 at the information center 2 to the vehicle 36 via the Internet 28 can be permanently installed in the memory device 53 of the onboard computer 40.

The troubleshooting guide will now be explained with reference to FIGS. 15 and 16 taking "How to check engine oil degradation" as an example. When the owner selects "How to check engine oil degradation" in the screen of FIG. 14, the screens R1, R2 and R3 shown in FIG. 15 successively appear on the display 52. Voice guidance matched to the images is given in parallel. Since the images show the same vehicle model as the one the owner is working on and are accompanied by the voice guidance, the owner can move ahead with the job with utmost ease.

Figure 16:
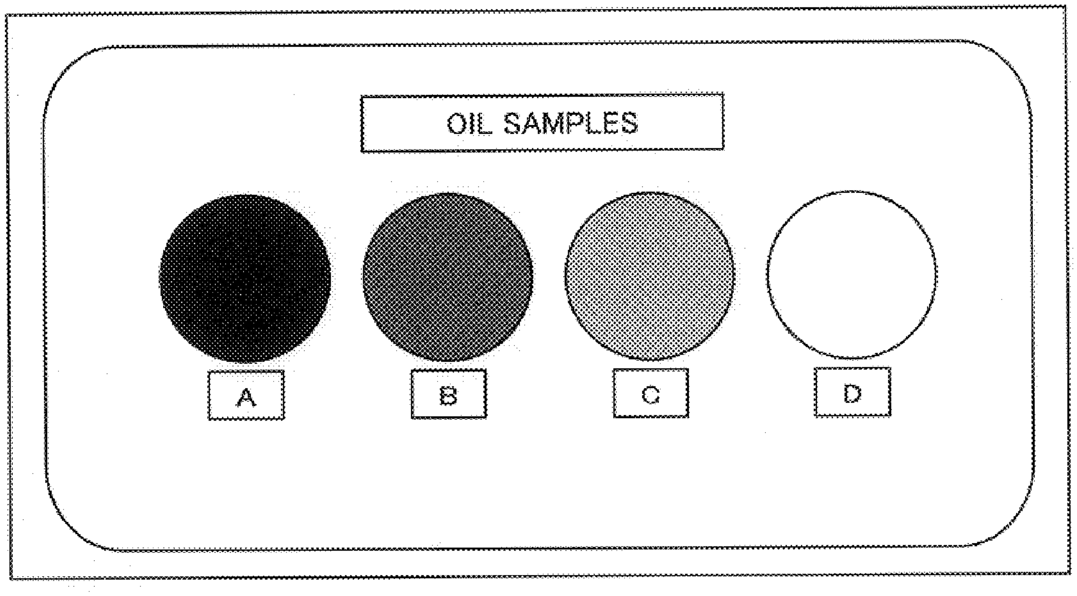
FIG. 16 is a diagram showing "Oil Samples" that appears on the onboard display when the owner performs an engine oil deterioration inspection following the "Troubleshooting Guide" according to an embodiment of the present invention.

FIG. 16 is an image displayed on the display 52 showing engine oil samples at four stages of deterioration (A, B, C and D). Stage A corresponds to "Time for oil change," B to "Almost time for oil change," and C and D to "Oil change unnecessary."

Figure 15:
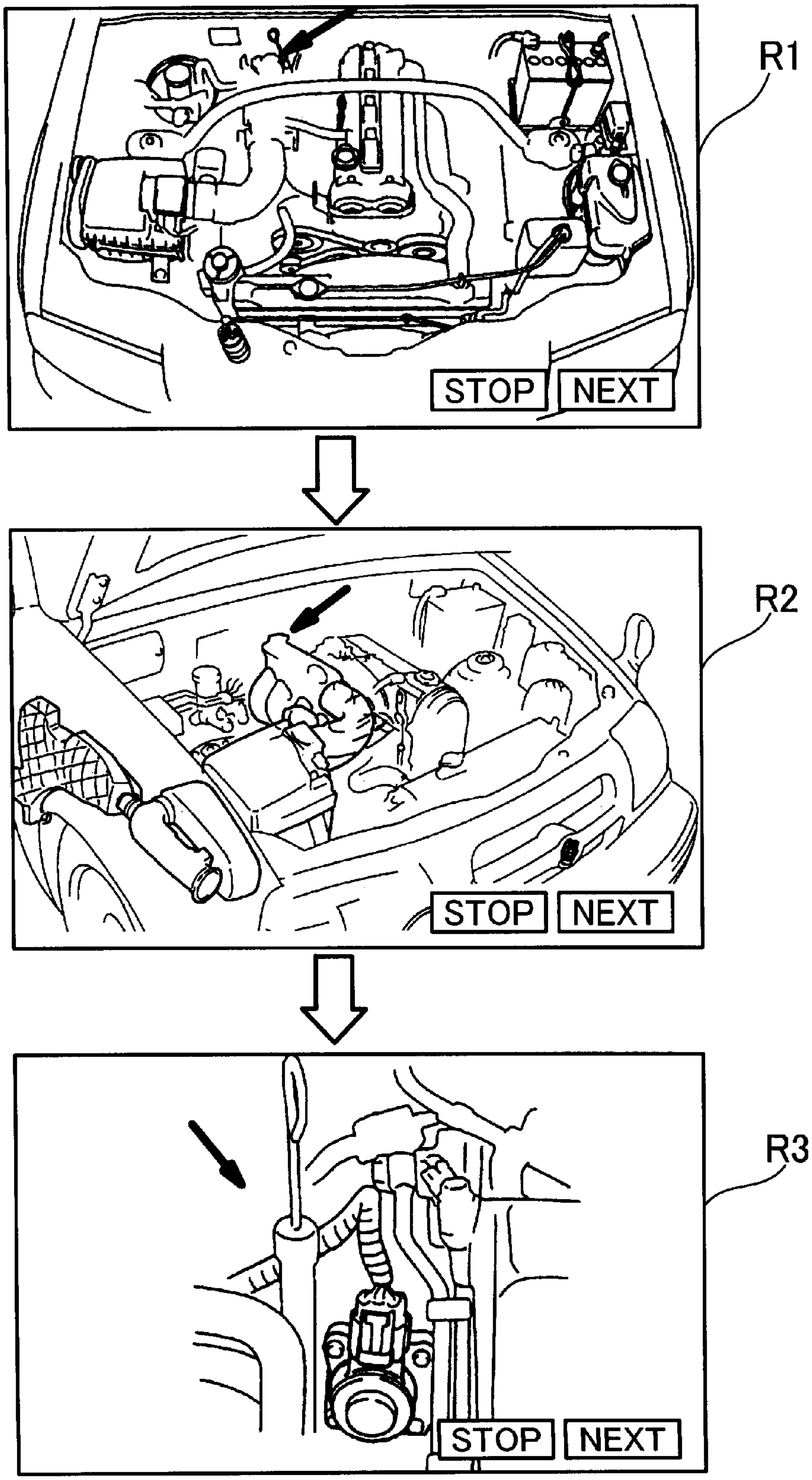
FIG. 15 is a diagram showing an example of an "Engine Oil Deterioration Inspection Method" that appears on the onboard display when the owner performs an engine oil deterioration inspection following the "Troubleshooting Guide" according to an embodiment of the present invention.

When carrying out an engine oil deterioration inspection, the owner obtains an engine oil sample by following the instructions of FIG. 15 and compares the oil sample with the four oil deterioration stages of FIG. 16 to determine which stage the sampled oil matches. The inspection can therefore be performed simply and accurately.

When the owner inputs the determined deterioration stage of the sampled oil, a message such as "Oil change necessary" appears on the display 52.

Or, instead, the deterioration stage determined by the owner can be sent to the remote troubleshooting server 6 to obtain guidance via the display 52 regarding "Time for oil change."

Figure 17:
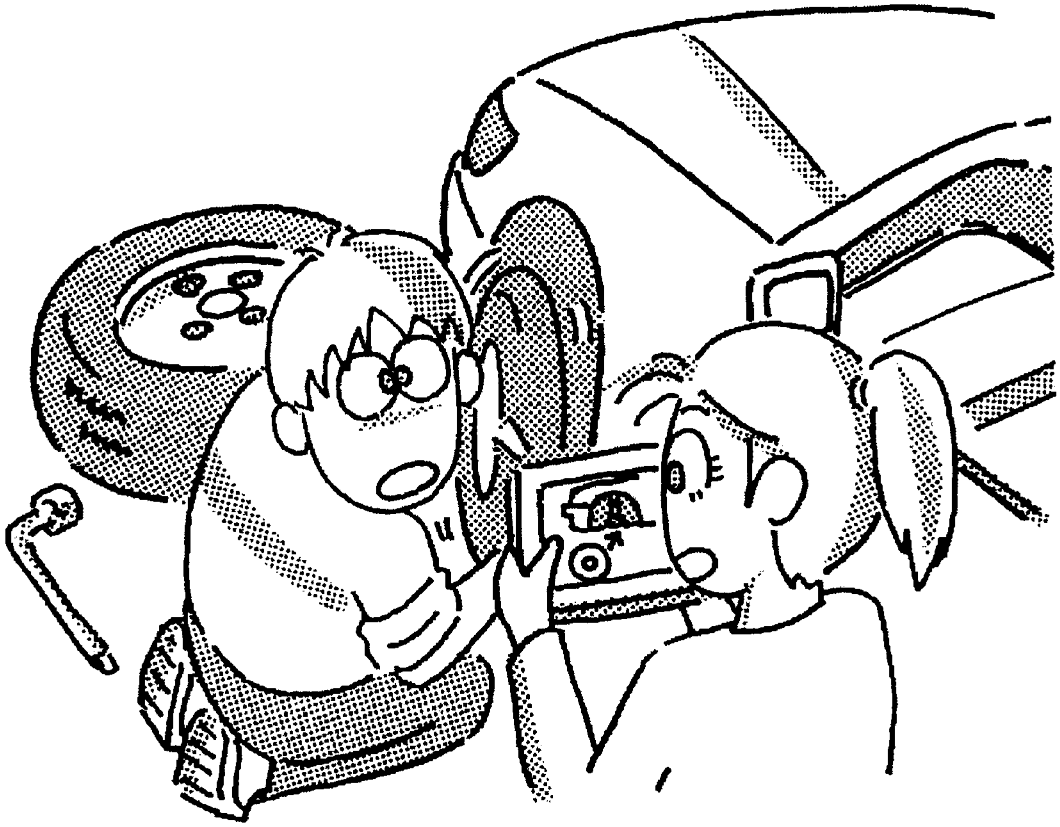
FIG. 17 is an illustration showing an owner changing a tire following the "Troubleshooting Guide" according to an embodiment of the present invention.

FIG. 17 shows an owner and assistant in the processes of changing a tire after selecting "Tire change" in FIG. 14. From the illustration in FIG. 17, it can be seen that the owner and assistant can complete the tire change without confusion by removing the display 52 from the onboard computer 40 and following the directions displayed on the display 52 and the simultaneous voice instructions.

Thus, when the owner needs to make a particular inspection, he or she can use the troubleshooting guide program to carry out the procedure following voice instructions while viewing pictures displayed on the display 52 detached from the vehicle that show the same vehicle model as the one being worked on. The inspection can therefore be conducted with high reliability even by a person who has little knowledge of the required steps. In addition, the owner can avoid bother and enjoy increased convenience, because there is no need to take the vehicle to a dealer or auto service shop.

As explained in the foregoing, the remote vehicle troubleshooting server, remote vehicle troubleshooting method, remote troubleshooting program, onboard remote troubleshooting apparatus and the like according to the present invention enable vehicle troubleshooting and inspection to be performed simply without need for the vehicle owner to visit a dealer and/or auto service shop. Moreover, they enable reliable vehicle troubleshooting and inspection to be performed using an up-to-date model-specific troubleshooting database, and further enable the vehicle owner to stay mindful of times for periodic inspection and replacement of expendable parts.

Although the present invention has been explained with reference to specific, preferred embodiments, one of ordinary skilled in the art will recognize that modifications and improvements can be made while remaining within the scope and spirit of the present invention. The scope of the present invention is determined solely by appended claims.

What is claimed is:

1. A server for remote vehicle troubleshooting for performing vehicle troubleshooting from a remote location comprising:

a troubleshooting program transmitter for transmitting to a vehicle a troubleshooting program for performing vehicle troubleshooting at the vehicle side upon receiving a request from an owner of the vehicle or at a predetermined time;

a vehicle inspection result receiver for receiving from the vehicle inspection results regarding the vehicle obtained by executing the troubleshooting program;

a trouble particular determining device for determining trouble particulars by analyzing the inspection results; and a trouble particular transmitter for transmitting the trouble particulars to the vehicle.

2. A server according to claim 1, wherein the troubleshooting program is periodically updated to the most recent information based on model-specific information including model-specific information on vehicle problems.

3. A server according to claim 1, wherein the server further comprises an appointment/order placement device for making a servicing appointment and placing an order for required parts with a dealer and/or auto service shop based on the trouble particulars determined by the trouble particular determining device.

4. A server for remote vehicle troubleshooting for performing vehicle troubleshooting from a remote location comprising:

means for transmitting to a vehicle a troubleshooting program for performing vehicle troubleshooting at the vehicle side upon receiving a request from an owner of the vehicle or at a predetermined time;

means for receiving from the vehicle inspection results regarding the vehicle obtained by executing the troubleshooting program;

means for determining trouble particulars by analyzing the inspection results; and means for transmitting the trouble particulars to the vehicle.

5. A server for remote vehicle troubleshooting for performing vehicle troubleshooting from a remote location comprising:

a trouble site pinpointing program transmitter for transmitting to a vehicle a trouble site pinpointing program for performing vehicle troubleshooting at the vehicle side when an owner of the vehicle feels that the vehicle is malfunctioning, the trouble site pinpointing program being made so that the owner selects a plurality of troubleshooting items that are hierarchically formatted;

a vehicle inspection result receiver for receiving from the vehicle inspection results regarding the vehicle obtained by executing the trouble site pinpointing program;

a trouble particular determining device for determining trouble particulars by analyzing the inspection results; and a trouble particular transmitter for transmitting the trouble particulars to the vehicle.

6. A server according to claim 5, wherein the trouble site pinpointing program is periodically updated to the most recent information based on model-specific information including model-specific information on vehicle problems.

7. A server according to claim 5, wherein the server further comprises an appointment/order placement device for making a servicing appointment and placing an order for required parts with a dealer and/or auto service shop based on the trouble particulars determined by the trouble particular determining device.

8. A server according to claim 5, wherein the plurality of troubleshooting items of the trouble site pinpointing program include at least basic performance irregularity and problem categories sensed by the owner.

9. A server according to claim 5, wherein the trouble site pinpointing program hierarchically displays the plurality of troubleshooting item on an onboard display so that the owner can select the items.

10. A server according to claim 5, wherein the trouble site pinpointing program produces various odd noises when the plurality of troubleshooting items are ones regarding odd noises so that the owner can select the items.

11. A server according to claim 5, wherein the trouble site pinpointing program instructs the owner to operate the vehicle and report results of the operation of the vehicle.

12. A server for remote vehicle troubleshooting for performing vehicle troubleshooting from a remote location comprising:

means for transmitting to a vehicle a trouble site pinpointing program for performing vehicle troubleshooting at the vehicle side when an owner of the vehicle feels that the vehicle is malfunctioning, the trouble site pinpointing program being made so that the owner selects a plurality of troubleshooting items that are hierarchically formatted;

means for receiving from the vehicle inspection results regarding the vehicle obtained by executing the trouble site pinpointing program;

means for determining trouble particulars by analyzing the inspection results; and means for transmitting the trouble particulars to the vehicle.

13. A method for performing vehicle troubleshooting from a remote location, the method comprising the steps of:

transmitting to a vehicle a troubleshooting program for performing vehicle troubleshooting at the vehicle side upon receiving a request from an owner of the vehicle or at a predetermined time;

receiving from the vehicle inspection results regarding the vehicle obtained by executing the troubleshooting program;

determining trouble particulars by analyzing the inspection results; and transmitting the trouble particulars to the vehicle.

14. A method according to claim 13, wherein the troubleshooting program is periodically updated to the most recent information based on model-specific information including model-specific information on vehicle problems.

15. A method according to claim 13, wherein the method further comprises the step of making a servicing appointment and placing an order for required parts with a dealer and/or auto service shop based on the trouble particulars determined by the determining step.

16. A method for performing vehicle troubleshooting from a remote location, the method comprising the steps of:

transmitting to a vehicle a trouble site pinpointing program for performing vehicle troubleshooting at the vehicle side when an owner of the vehicle feels that the vehicle is malfunctioning, the trouble site pinpointing program being made so that the owner selects a plurality of troubleshooting items that are hierarchically formatted;

receiving from the vehicle inspection results regarding the vehicle obtained by executing the trouble site pinpointing program;

determining trouble particulars by analyzing the inspection results; and transmitting the trouble particulars to the vehicle.

17. A method according to claim 16, wherein the trouble site pinpointing program is periodically updated to the most recent information based on model-specific information including model-specific information on vehicle problems.

18. A method according to claim 16, wherein the method further comprises the step of making a servicing appointment and placing an order for required parts with a dealer and/or auto service shop based on the trouble particulars determined by the determining step.

19. A method according to claim 16, wherein the plurality of troubleshooting items of the trouble site pinpointing program include at least basic performance irregularity and problem categories sensed by the owner.

20. A method according to claim 16, wherein the trouble site pinpointing program hierarchically displays the plurality of troubleshooting item on an onboard display so that the owner can select the items.

21. A method according to claim 16, wherein the trouble site pinpointing program produces various odd noises when the plurality of troubleshooting items are ones regarding odd noises so that the owner can select the items.

22. A method according to claim 16, wherein the trouble site pinpointing program instructs the owner to operate the vehicle and report results of the operation of the vehicle.

23. A program for controlling a computer of a server to perform vehicle troubleshooting from a remote location, the program comprising:

instructions for transmitting to a vehicle a troubleshooting program for performing vehicle troubleshooting at the vehicle side upon receiving a request from an owner of the vehicle or at a predetermined time;

instructions for receiving from the vehicle inspection results regarding the vehicle obtained by executing the troubleshooting program;

instructions for determining trouble particulars by analyzing the inspection results; and instructions for transmitting the trouble particulars to the vehicle.

24. A program according to claim 23, wherein the troubleshooting program is periodically updated to the most recent information based on model-specific information including model-specific information on vehicle problems.

25. A program according to claim 23, wherein the program further comprises instructions for making a servicing appointment and placing an order for required parts with a dealer and/or auto service shop based on the trouble particulars determined by the determining instructions.

26. A program for controlling a computer of a server to perform vehicle troubleshooting from a remote location, the program comprising:

instructions for transmitting to a vehicle a trouble site pinpointing program for performing vehicle troubleshooting at the vehicle side when an owner of the vehicle feels that the vehicle is malfunctioning, the trouble site pinpointing program being made so that the owner selects a plurality of troubleshooting items that are hierarchically formatted;

instructions for receiving from the vehicle inspection results regarding the vehicle obtained by executing the trouble site pinpointing program;

instructions for determining trouble particulars by analyzing the inspection results; and instructions for transmitting the trouble particulars to the vehicle.

27. A program according to claim 26, wherein the trouble site pinpointing program is periodically updated to the most recent information based on model-specific information including model-specific information on vehicle problems.

28. A program according to claim 26, wherein the program further comprises instructions for making a servicing appointment and placing an order for required parts with a dealer and/or auto service shop based on the trouble particulars determined by the determining instructions.

29. A program according to claim 26, wherein the plurality of troubleshooting items of the trouble site pinpointing program include at least basic performance irregularity and problem categories sensed by the owner.

30. A program according to claim 26, wherein the trouble site pinpointing program hierarchically displays the plurality of troubleshooting item on an onboard display so that the owner can select the items.

31. A program according to claim 26, wherein the trouble site pinpointing program produces various odd noises when the plurality of troubleshooting items are ones regarding odd noises so that the owner can select the items.

32. A program according to claim 26, wherein the trouble site pinpointing program instructs the owner to operate the vehicle and report results of the operation of the vehicle.

33. A method for performing vehicle troubleshooting from a remote location, the method comprising the steps of:

receiving from an external server a troubleshooting program for performing vehicle troubleshooting at the vehicle side upon receiving a request from an owner of the vehicle or at a predetermined time;

executing the troubleshooting program to obtain inspection results regarding the vehicle;

transmitting the inspection results to the external server so that the external server can determine trouble particulars by analyzing the inspection results; and receiving the trouble particulars from the external server.

34. A method for performing vehicle troubleshooting from a remote location, the method comprising the steps of:

receiving from an external server a trouble site pinpointing program for performing vehicle troubleshooting at the vehicle side when an owner of the vehicle feels that the vehicle is malfunctioning, the trouble site pinpointing program being made so that the owner selects a plurality of troubleshooting items that are hierarchically formatted;

executing the trouble site pinpointing program to obtain inspection results regarding the vehicle;

transmitting the inspection results to the external server so that the external server can determine trouble particulars by analyzing the inspection results; and receiving the trouble particulars from the external server.

35. A program for controlling an onboard computer of a vehicle to perform vehicle troubleshooting from a remote location, the program comprising:

instructions for receiving from an external server a troubleshooting program for performing vehicle troubleshooting at the vehicle side upon receiving a request from an owner of the vehicle or at a predetermined time;

instructions for executing the troubleshooting program to obtain inspection results regarding the vehicle;

instructions for transmitting the inspection results to the external server so that the external server can determine trouble particulars by analyzing the inspection results; and instructions for receiving the trouble particulars from the external server.

36. A program according to claim 35, wherein the troubleshooting program is periodically updated to the most recent information based on model-specific information including model-specific information on vehicle problems.

37. A program according to claim 35, wherein the program further comprises instructions for making a servicing appointment and placing an order for required parts with a dealer and/or auto service shop based on the trouble particulars determined by the external server.

38. A program for controlling an onboard computer of a vehicle to perform vehicle troubleshooting from a remote location, the program comprising:

instructions for receiving from an external server a trouble site pinpointing program for performing vehicle troubleshooting at the vehicle side when an owner of the vehicle feels that the vehicle is malfunctioning, the trouble site pinpointing program being made so that the owner selects a plurality of troubleshooting items that are hierarchically formatted;

instructions for executing the trouble site pinpointing program to obtain inspection results regarding the vehicle;

instructions for transmitting the inspection results to the external server so that the external server can determine trouble particulars by analyzing the inspection results; and instructions for receiving the trouble particulars from the external server.

39. A program according to claim 38, wherein the trouble site pinpointing program is periodically updated to the most recent information based on model-specific information including model-specific information on vehicle problems.

40. A program according to claim 38, wherein the program further comprises instructions for making a servicing appointment and placing an order for required parts with a dealer and/or auto service shop based on the trouble particulars determined by the external server.

41. A program according to claim 38, wherein the plurality of troubleshooting items of the trouble site pinpointing program include at least basic performance irregularity and problem categories sensed by the owner.

42. A program according to claim 38, wherein the trouble site pinpointing program hierarchically displays the plurality of troubleshooting item on an onboard display so that the owner can select the items.

43. A program according to claim 38, wherein the trouble site pinpointing program produces various odd noises when the plurality of troubleshooting items are ones regarding odd noises so that the owner can select the items.

44. A program according to claim 38, wherein the trouble site pinpointing program instructs the owner to operate the vehicle and report results of the operation of the vehicle.

* * * * *